Nov. 6, 1962   I. H. LUNDQUIST ETAL   3,062,133
POSTAL METER
Filed March 11, 1960   14 Sheets-Sheet 8

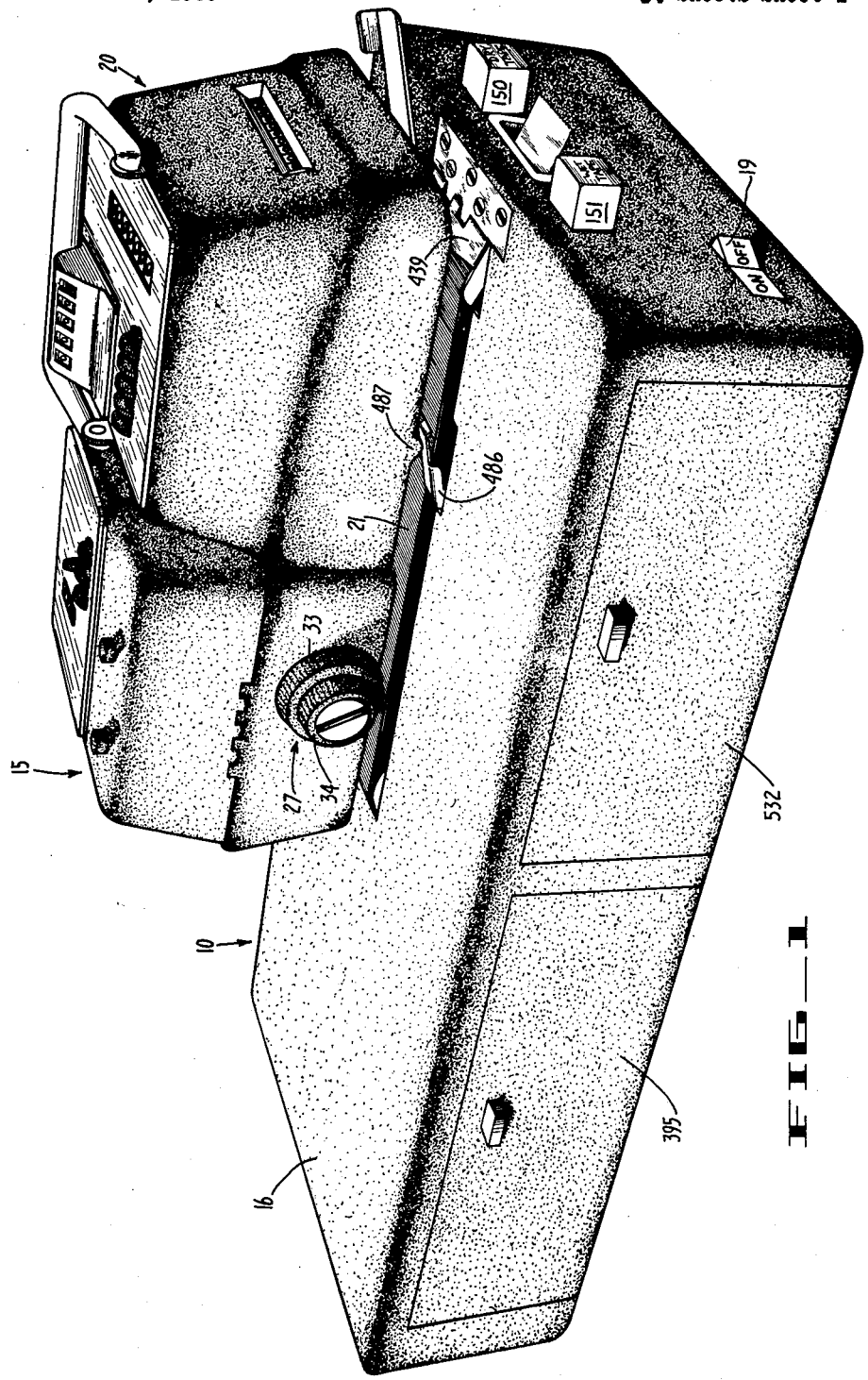

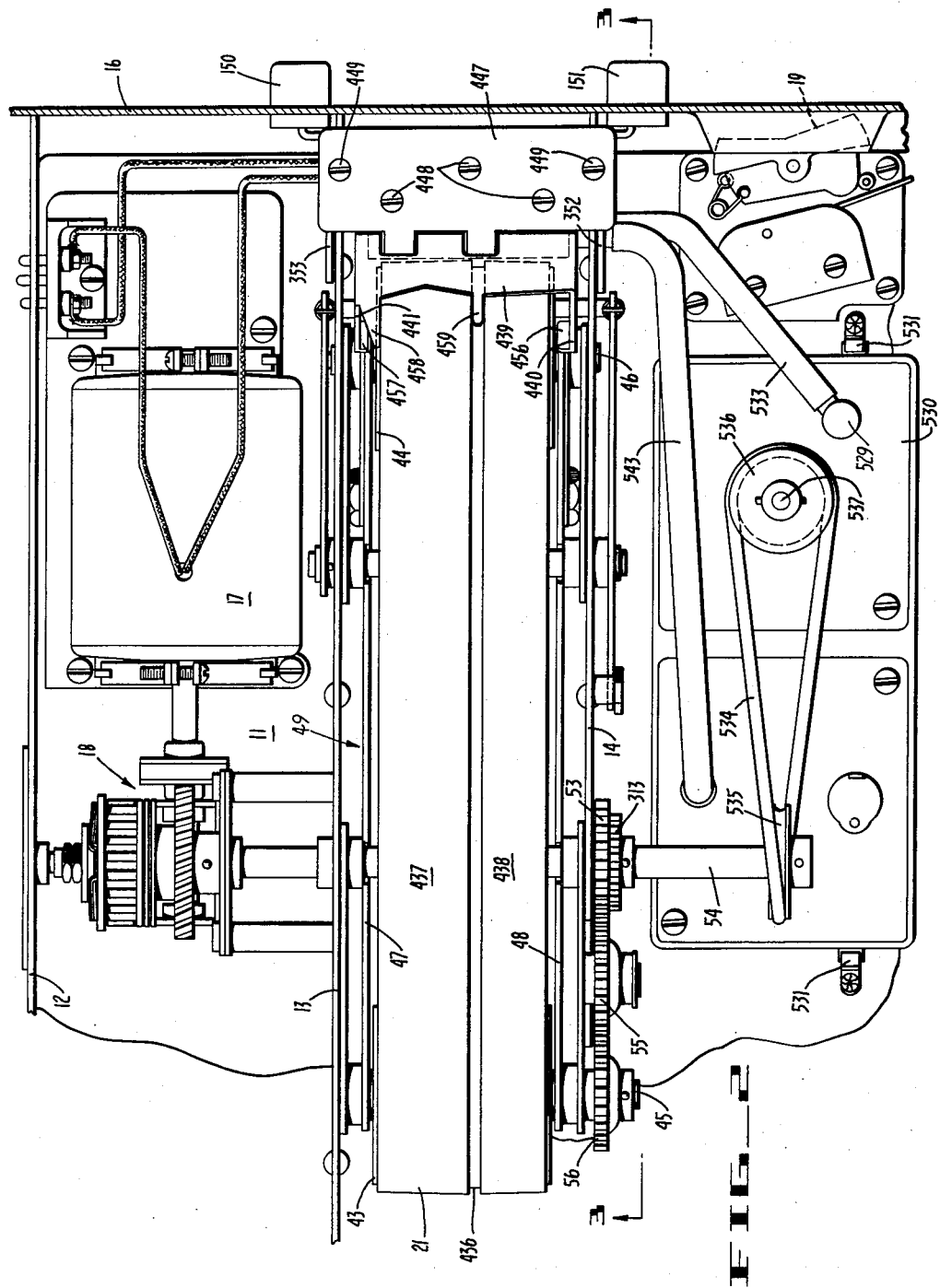

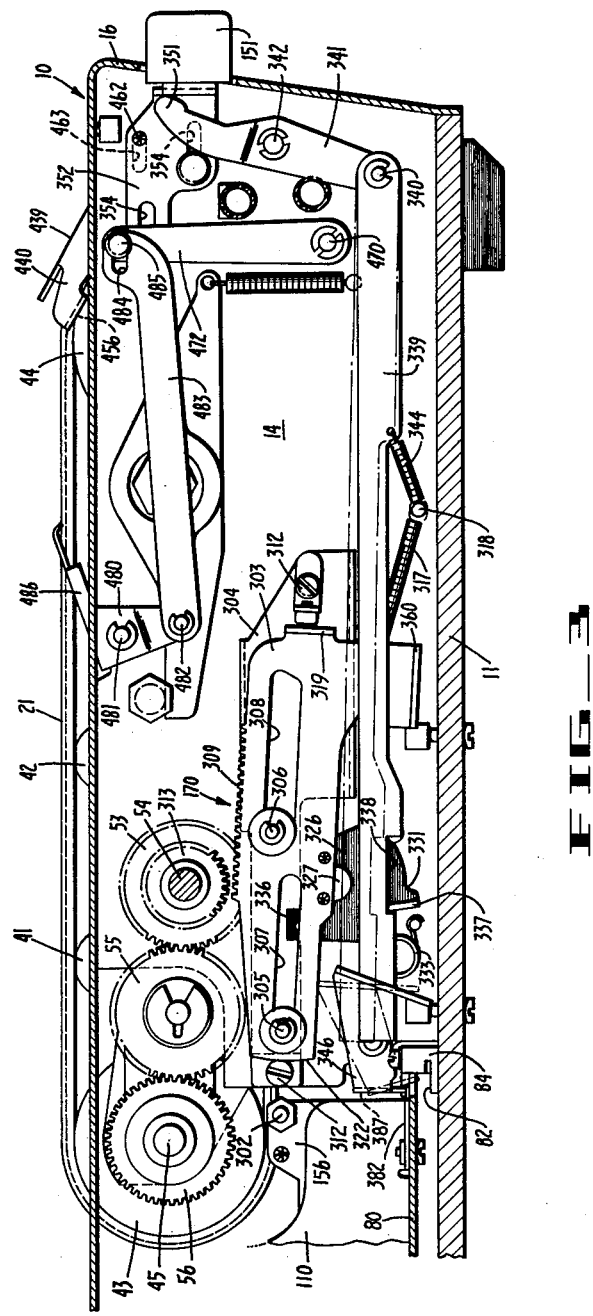

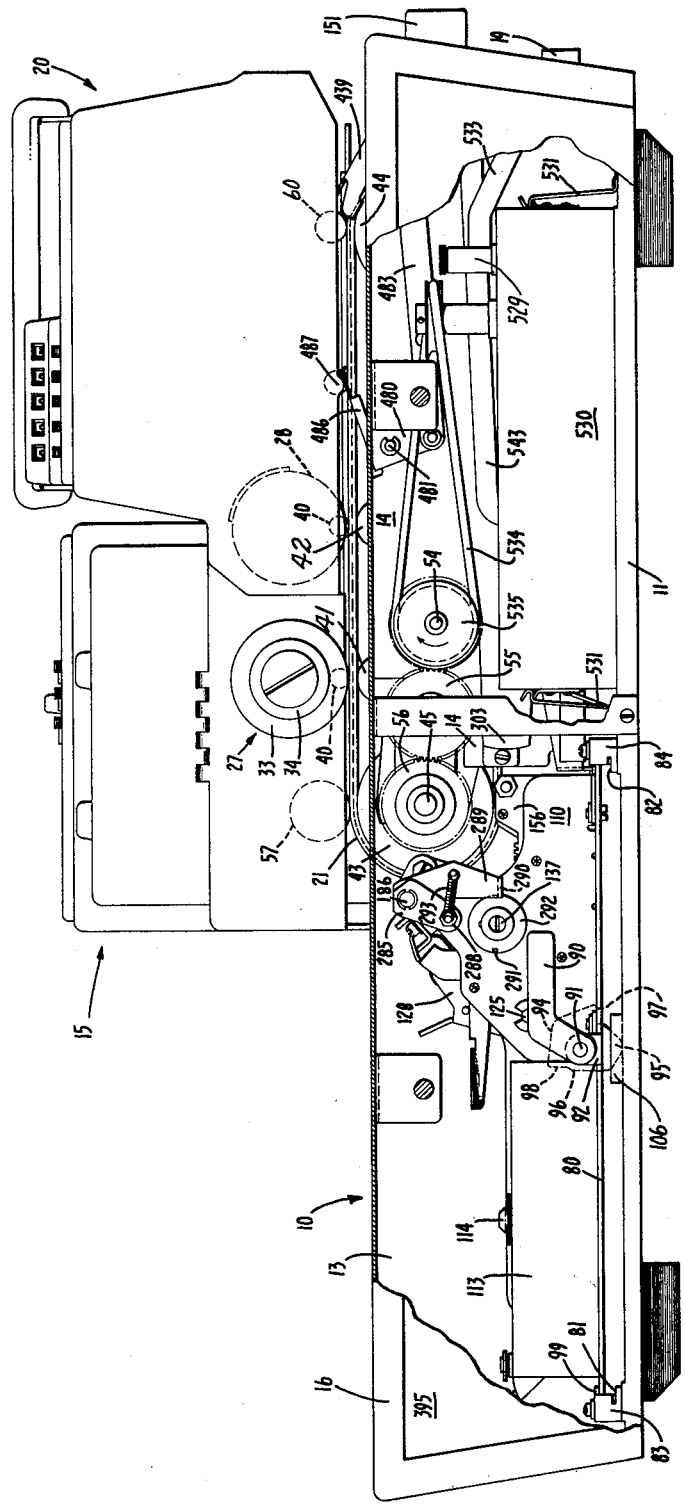

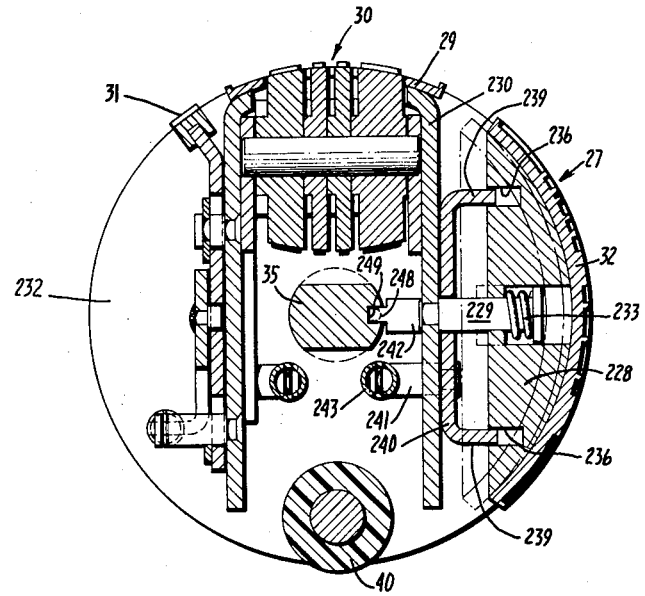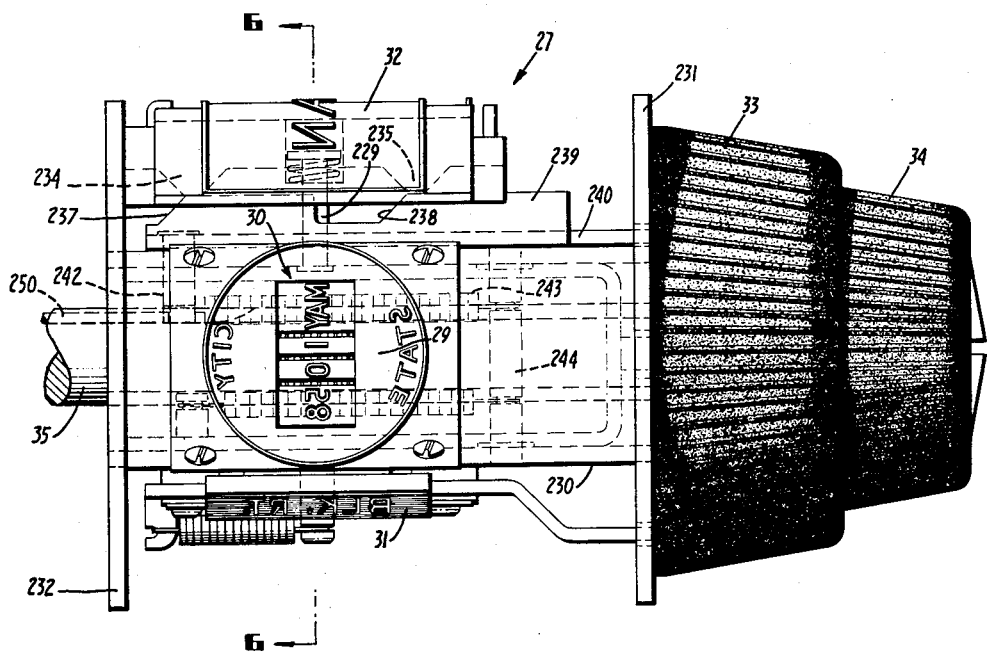

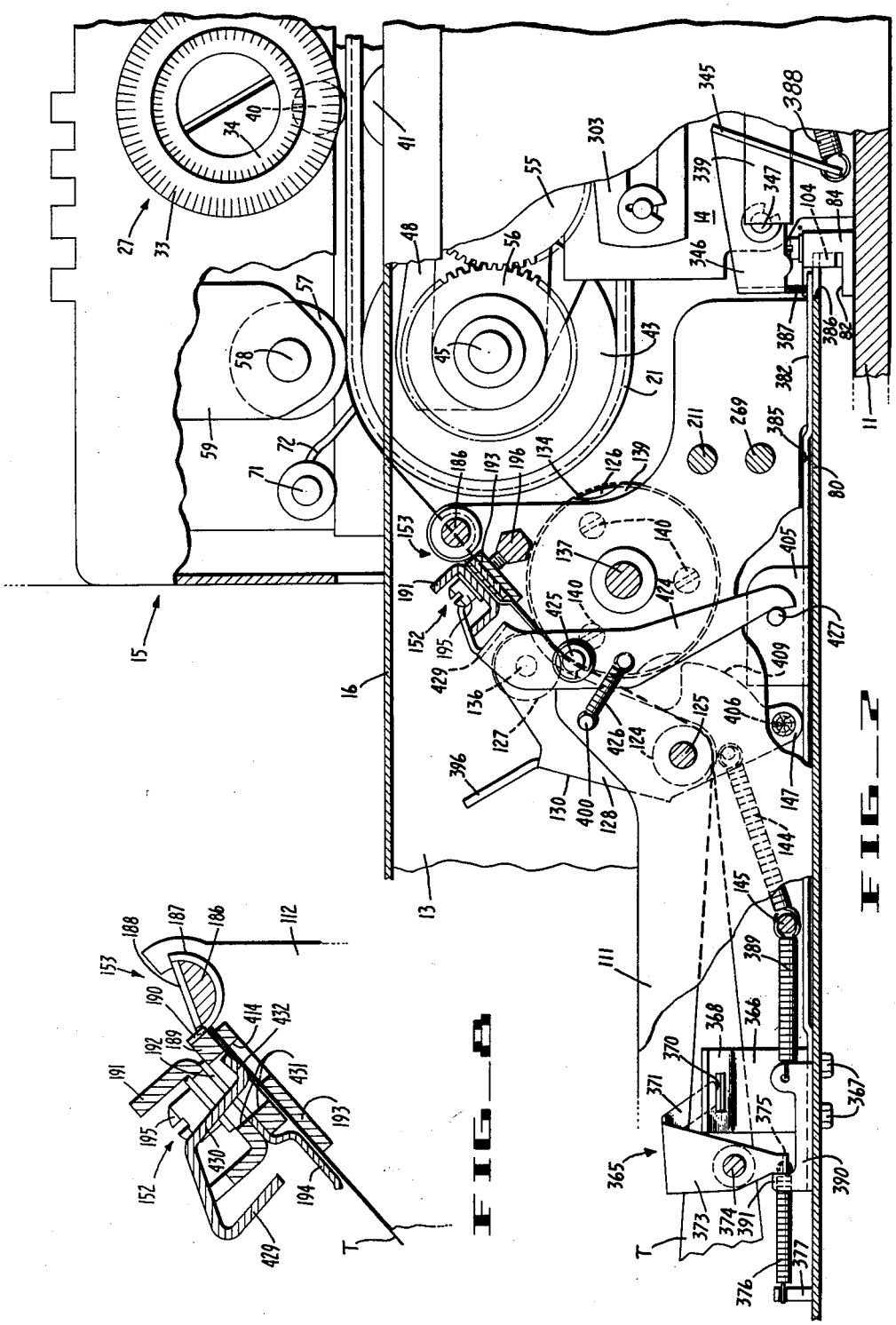

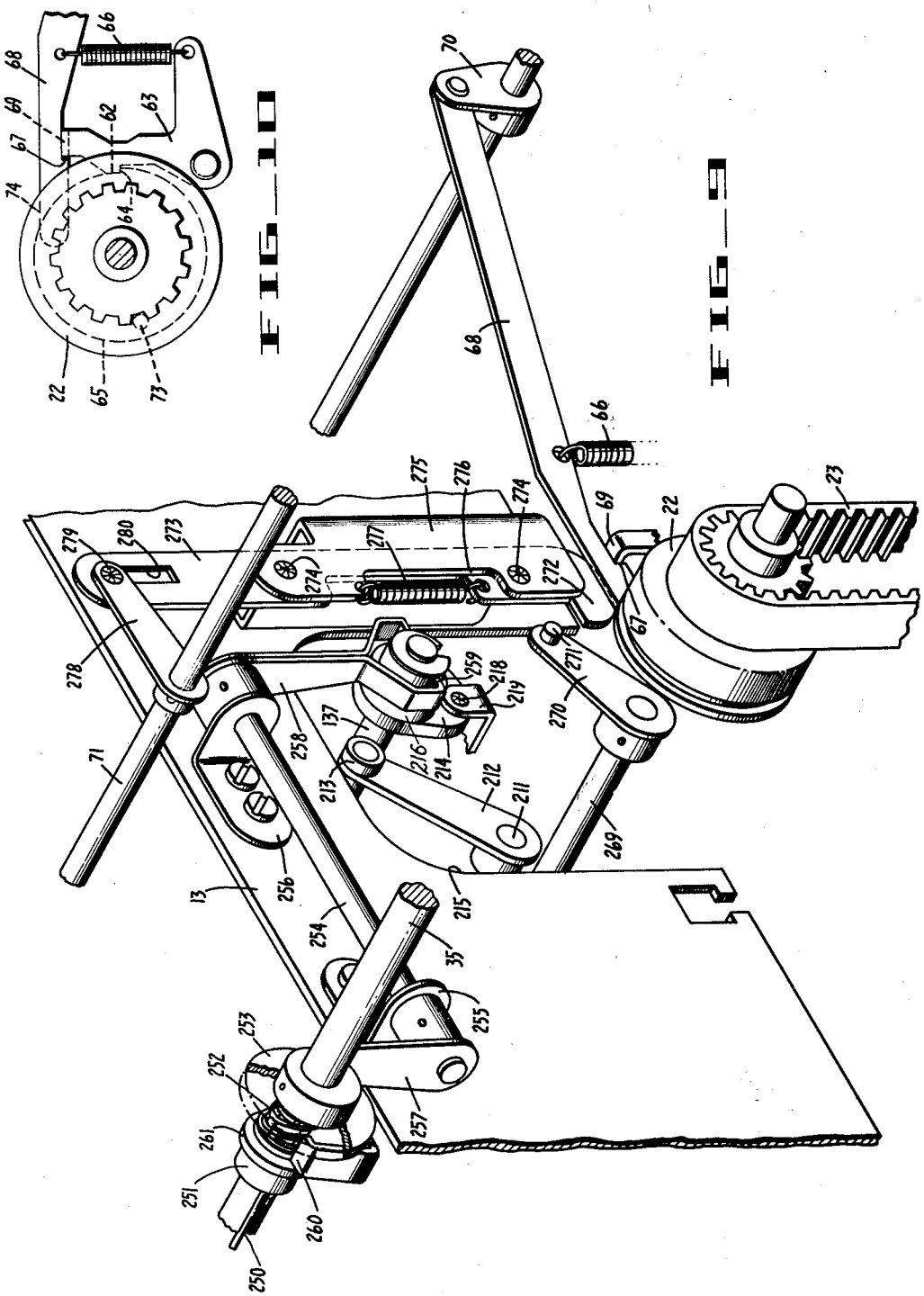

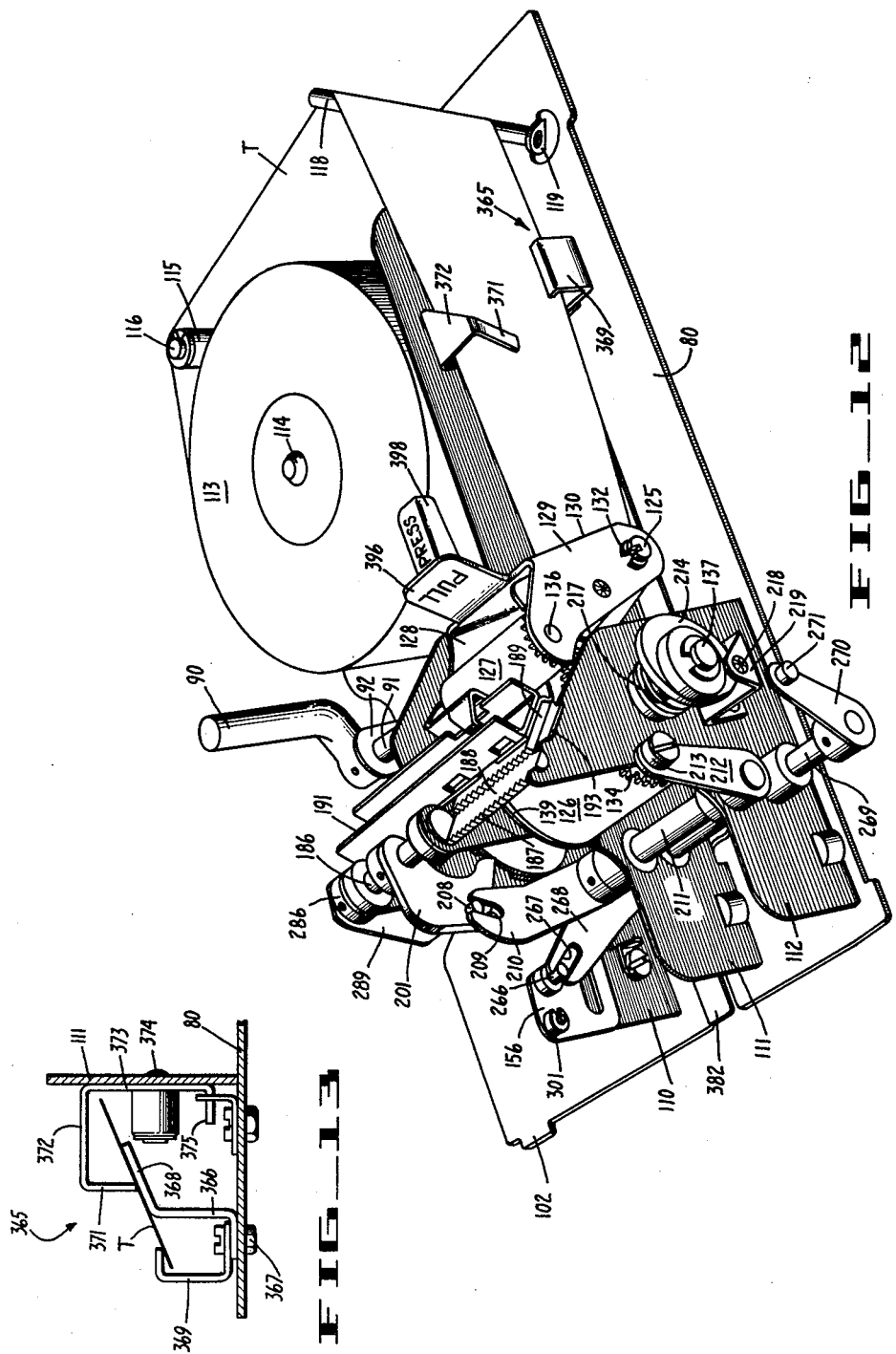

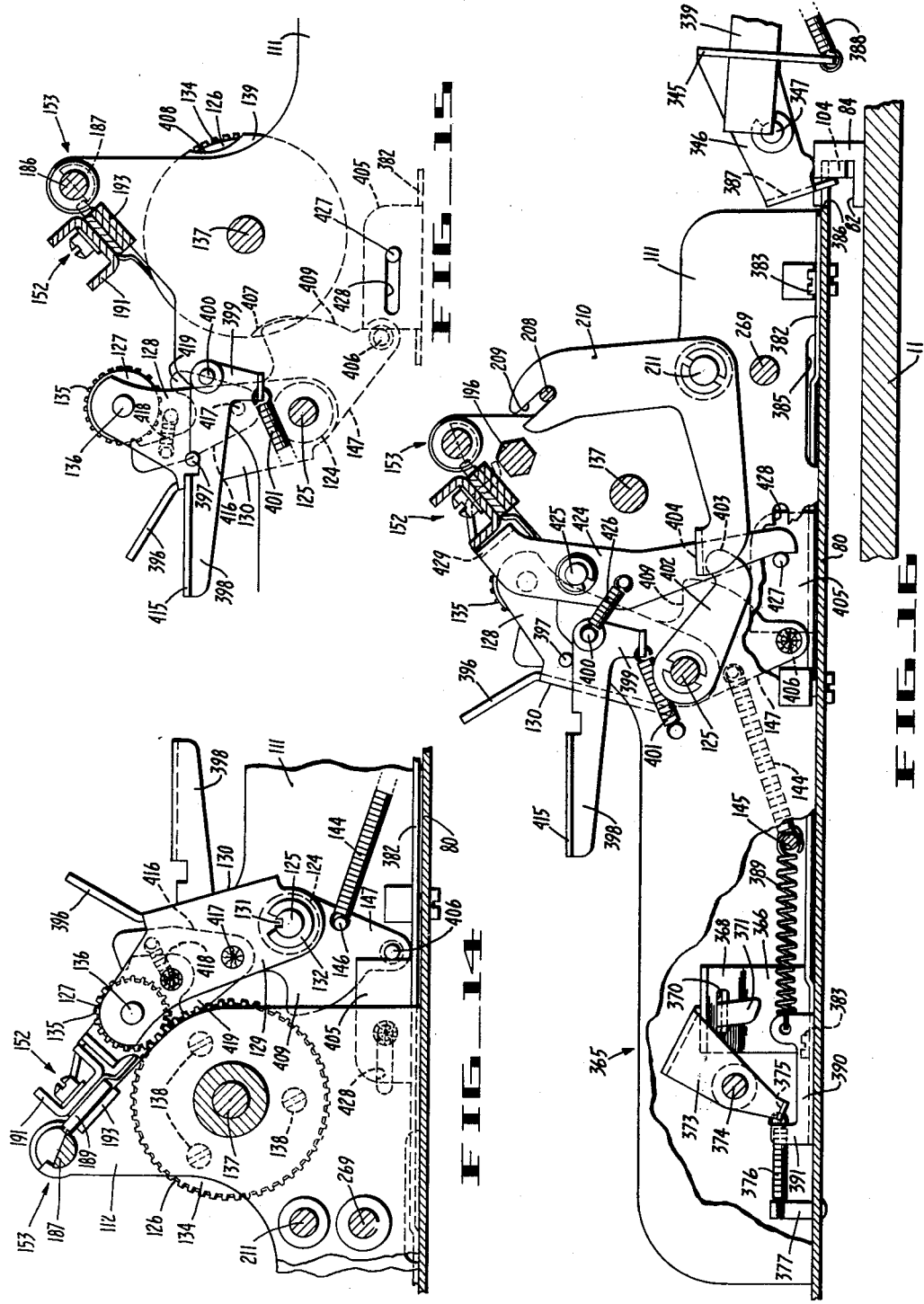

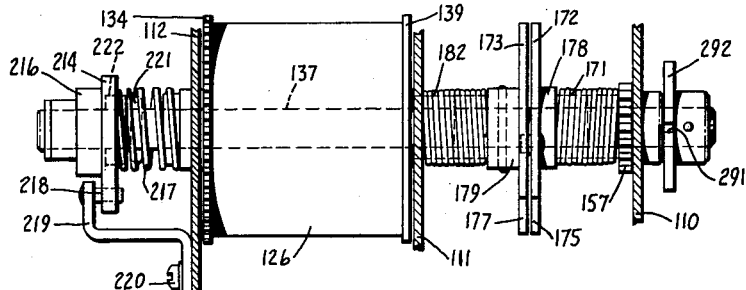
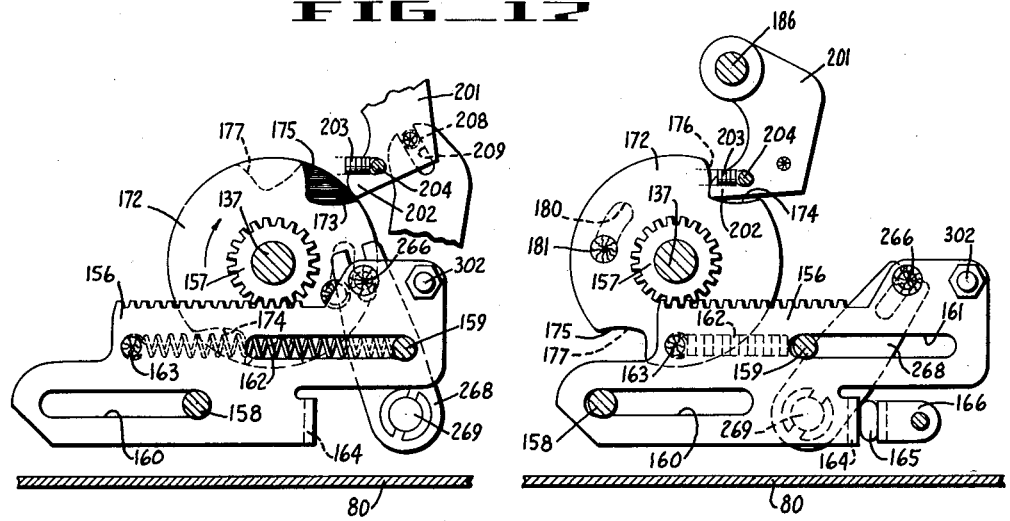
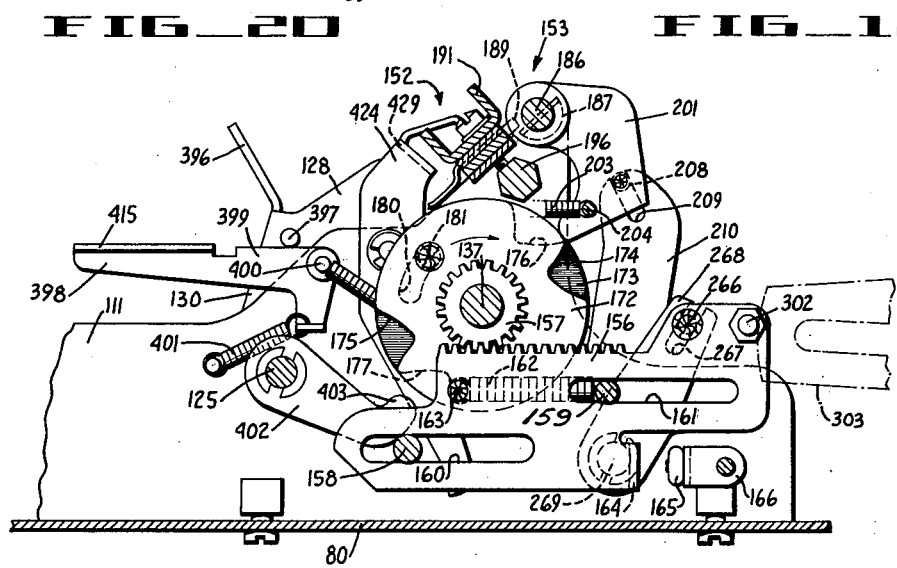

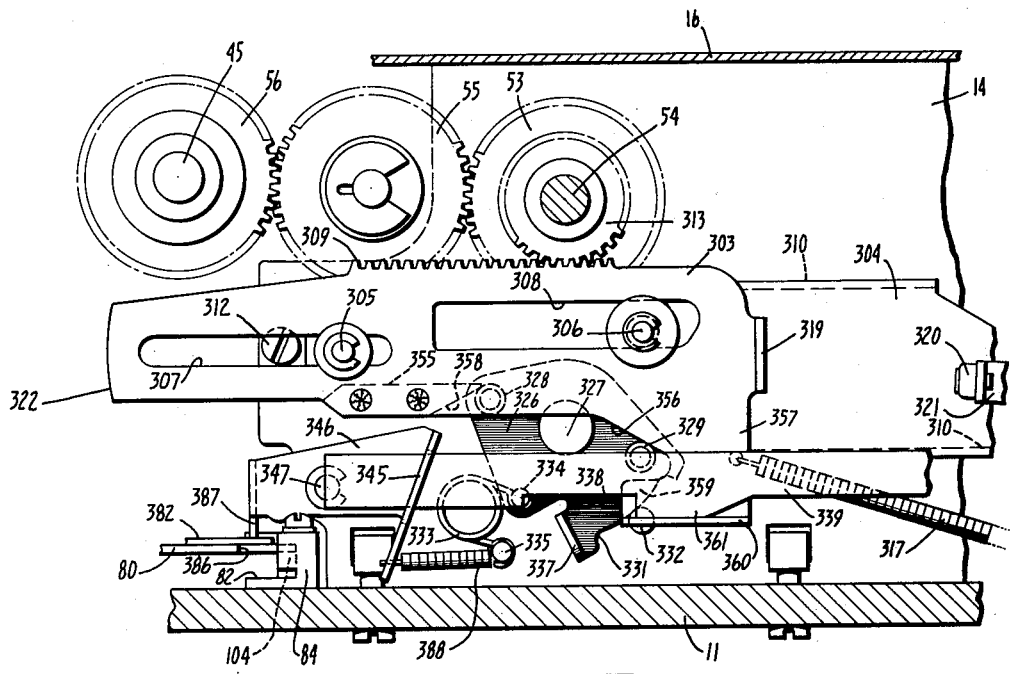
FIG_22
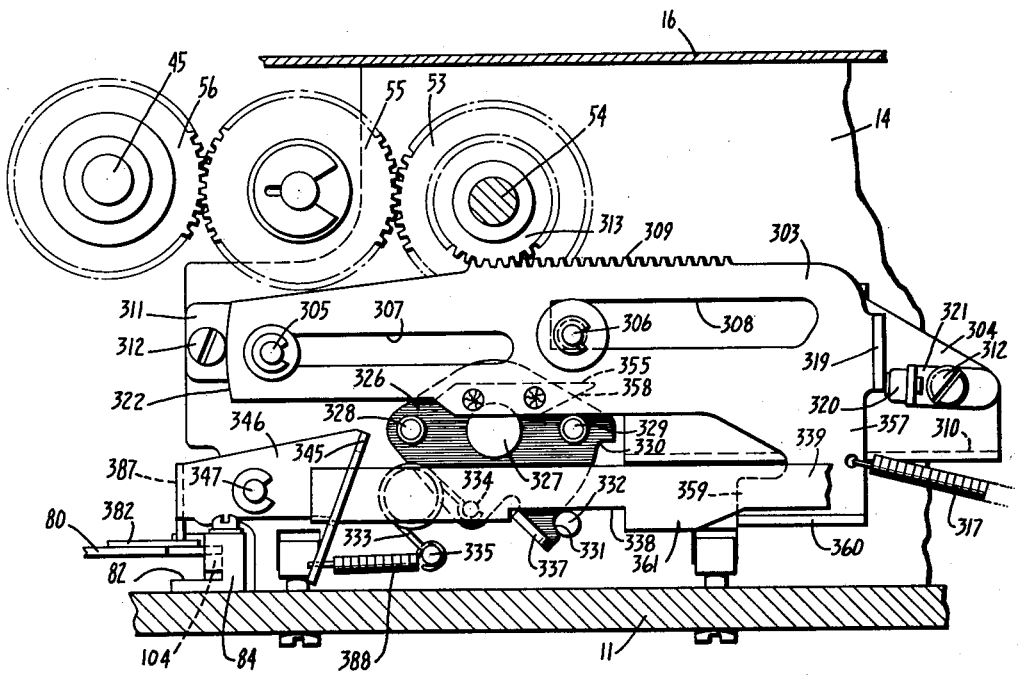
FIG_21

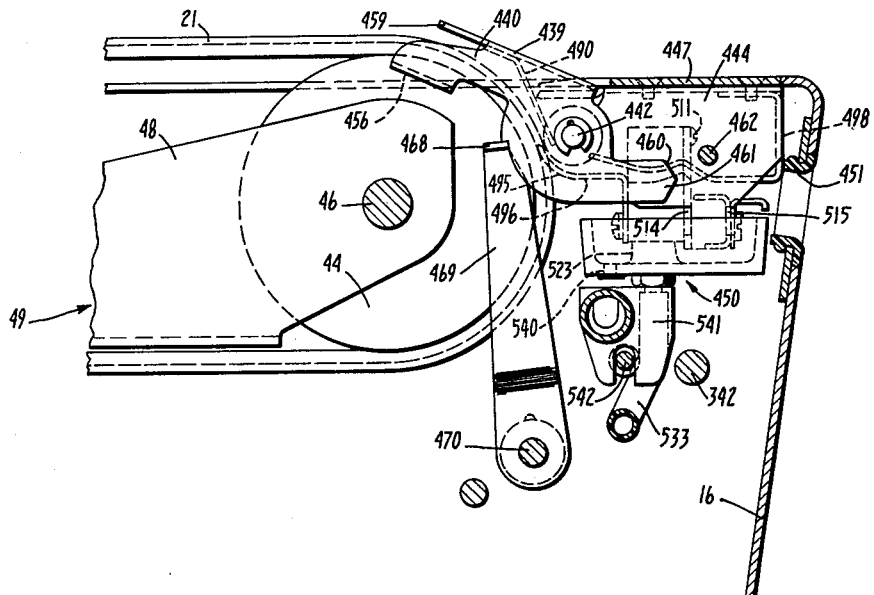
FIG_24
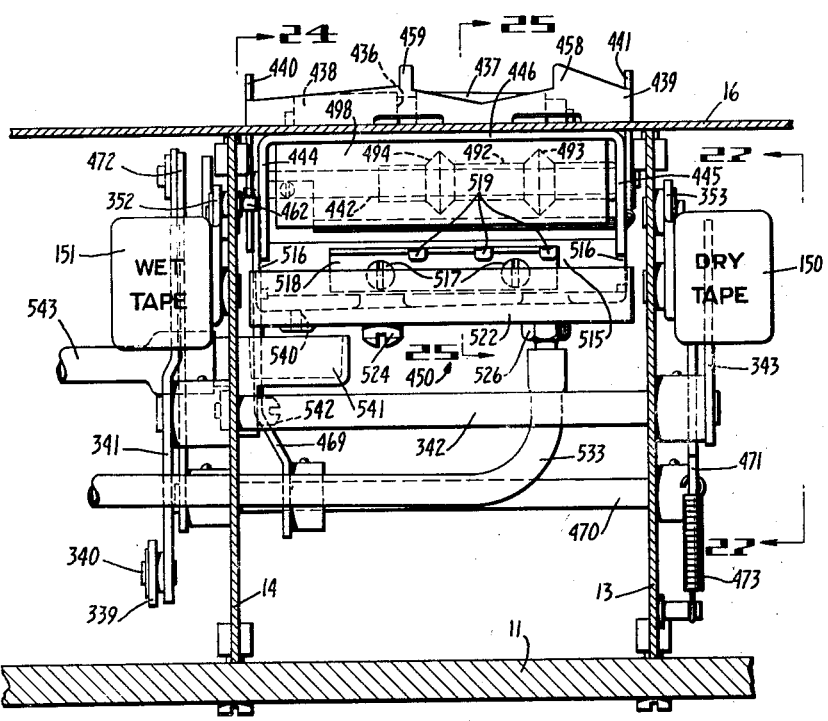
FIG_23

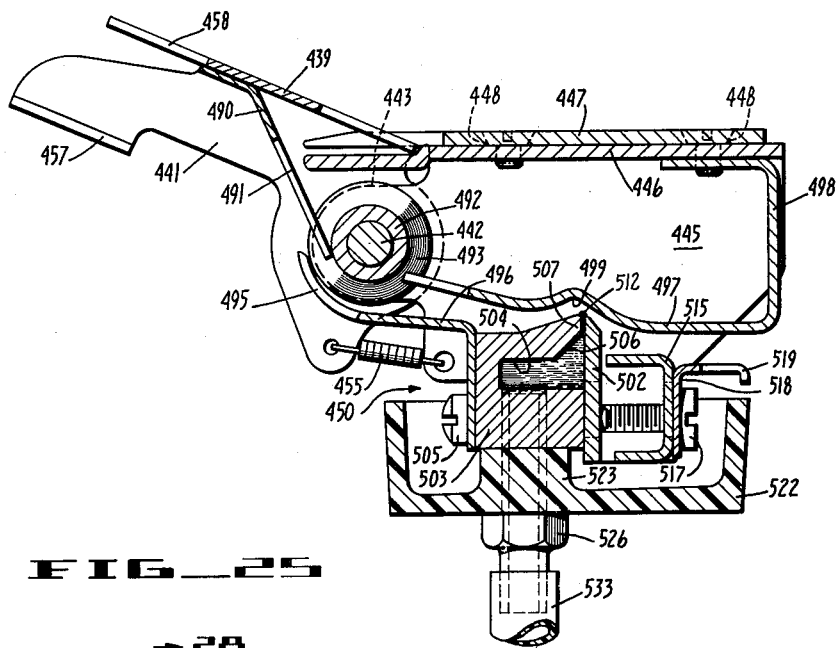
FIG_25
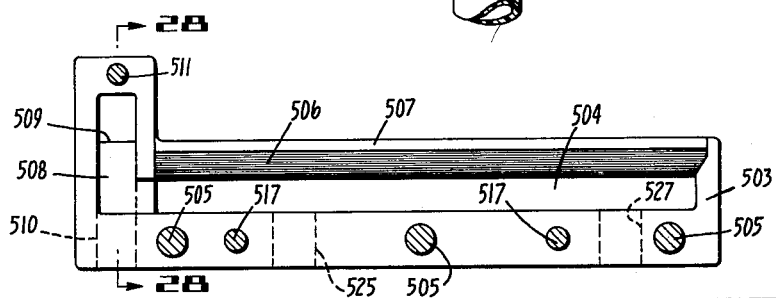
FIG_26
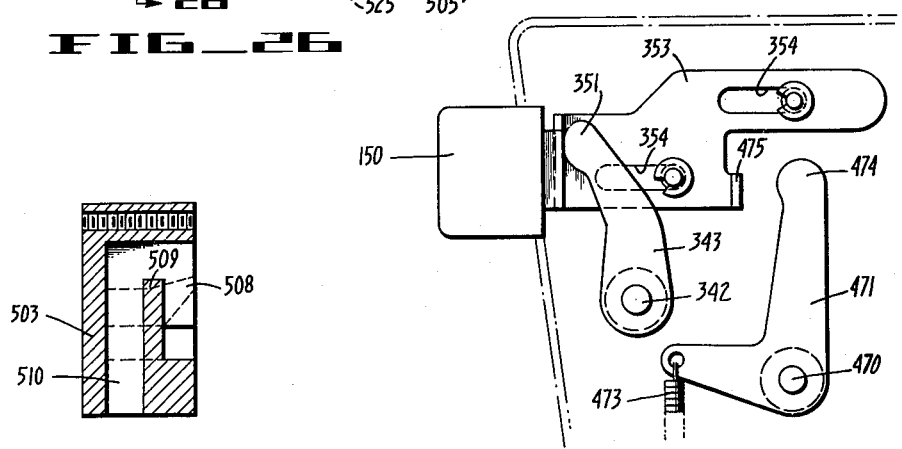
FIG_28
FIG_27

United States Patent Office
3,062,133
Patented Nov. 6, 1962

3,062,133
POSTAL METER
Ingemar H. Lundquist, Oakland, and Willy Schaerer, Hayward, Calif., assignors, by mesne assignments, to International Postal Supply Corporation, a corporation of Massachusetts
Filed Mar. 11, 1960, Ser. No. 14,375
21 Claims. (Cl. 101—92)

This invention relates to a tape unit control mechanism as used in a postage printing machine wherein postage may be selectively printed on either letters or tape at the same printing station. More particularly, the invention relates to a mechanism for cutting the tape into strips of predetermined lengths, passing the tape strips to a printing station for an impression by each of a pair of rotary printing dies and, thence, to a position where the printed strips are dispensed for use, moistened or non-moistened, as desired.

It is, therefore, an object of the present invention to provide an improved label or adhesive strip dispensing mechanism.

Another object of the invention is to provide an improved control means for a tape feed mechanism whereby the severing of tape strips of selective lengths from a roll of tape is effected.

A further object of the invention is to provide a control means for use with a tape feed device adapted to selectively discharge a previously severed strip of gummed tape in a moistened or non-moistened state.

Another object of the present invention is to provide an improved tape feed mechanism and moistening means therefor effective selectively to dispense previously severed gummed strips in a moistened or non-moistened state.

Another object of the present invention is to provide a postage printing machine with an improved tape control mechanism whereby severed strips of tape are successively presented to, and pass between, the printing dies and the coacting impression members in the same position that an envelope would ordinarily be presented for receiving a postage indicia impression thereon.

Another object of the invention is to provide an improved tape feed mechanism for a postage metering machine operable to selectively sever strips of tape of a plurality of predetermined lengths from a roll of tape, to effect advancement of the severed strips to a printing station and to thereafter dispense the severed strips selectively in either a moistened or non-moistened state.

Another object of the present invention is to provide a postage metering machine with an improved tape feed mechanism which may be readily removed from the machine.

A further object of the invention is the provision of an improved tape feed mechanism for a postage metering machine and novel means therein effective to prevent operation of the tape feed mechanism upon depletion of the tape supply.

Another object of the invention is to provide an improved tape feed mechanism and moistening device for a postage metering machine and selectively operable control means therefor operative to effect operation of the tape feed mechanism and a discharge of the tape in a non-moistened state or direction of the tape across the restricted slot of a moistening blade through which liquid is circulated under pressure, causing the tape to be discharged in a moistened state.

A further object of the present invention is to provide a postage metering machine with an improved moistening device wherein liquid is circulated under pressure within the restricted slot of a moistening blade, thereby substantially preventing a coagulation of foreign matter and gum at the discharge surface of the slot.

Other objects and advantages will be apparent from the following description of a preferred embodiment of the invention as illustrated in the accompanying drawings in which:

FIG. 1 is a frontal perspective of the fully assembled postage metering machine;

FIG. 2 is a fragmentary plan view of the base portion of the machine with cover removed showing the feed belt, the pump unit for the moistening device and the drive mechanism for both;

FIG. 3 is a fragmentary elevational view showing the normal inactive position of the power-driven actuator for the tape feed drive mechanism and the controls therefor in the base portion of the machine, the view being taken on the plane indicated by the line 3—3 in FIG. 2;

FIG. 4 is a frontal elevational view of the machine with the cover of the base portion broken away to more clearly show the mechanism therein;

FIG. 5 is a plan view of the auxiliary, or slogan, print head;

FIG. 6 is a sectional elevational view of the auxiliary print head, the view being taken on the plane indicated by the line 6—6 in FIG. 5;

FIG. 7 is a fragmentary sectional elevational view of the base portion of the machine showing the tape feed mechanism;

FIG. 8 is a detailed sectional view of the tape cutting device;

FIG. 9 is an isometric view showing the selective control for the tape feed and the main drive clutch control mechanism;

FIG. 10 is an elevational view of the drive clutch-engaging mechanism;

FIG. 12 is an oblique plan view of the tape feed mechanism;

FIG. 13 is an elevational view of the mechanism for sensing the depletion of the tape supply, the view being taken on the plane indicated by the line 13—13 in FIG. 11;

FIG. 14 is a fragmentary elevational view of the tape feed mechanism with the parts in operative position, the view being taken on the plane indicated by the line 14—14 in FIG. 11;

FIG. 15 is a fragmentary elevational view of the tape feed roller and tape guide mechanism with the tape guide locked in its inoperative position to enable the threading of the tape over the feed roller;

FIG. 16 is a sectional elevational view of the tape feed mechanism showing the tape guide in its operative position and the means for sensing the depletion of the tape supply in its actuated position, the view being taken on the planes indicated by the lines 16—16 in FIG. 11;

FIG. 17 is an elevational view of the tape feed roller and a portion of the driving mechanism therefor, the view being taken on the plane indicated by the line 17—17 in FIG. 11;

FIG. 18 is a fragmentary sectional elevational view showing the normal inactive position of the parts for controlling angular rotation of the tape feed roller;

FIG. 19 is a sectional elevational view similar to FIG. 18 but showing the relative position of the parts following the initial actuation of the driving mechanism, the view being taken on the planes indicated by the lines 19—19 in FIG. 11;

FIG. 20 is a fragmentary section elevational view similar to FIG. 18 but showing the relative position of the parts following a completed actuation of the driving mechanism for the tape feed roller;

FIG. 21 is a fragmentary detailed showing of the power-driven actuator, the view similar to FIG. 3 but with the rack initially engaged with the continuously driven gear;

FIG. 22 is a view similar to FIG. 21 but showing the rack in its fully actuated position;

FIG. 23 is an elevational view of the moistening device, the view being taken from the right end in FIG. 2 immediately inside the cover;

FIG. 24 is an elevational view of the moistening device, the view being taken on the plane indicated by the line 24—24 in FIG. 23;

FIG. 25 is a sectional elevational view of the moistening device, the view being taken on the plane indicated by the line 25—25 in FIG. 23;

FIG. 26 is a detailed sectional view of the moistening device taken longitudinally thereof and showing the liquid chamber therein;

Figure 11:
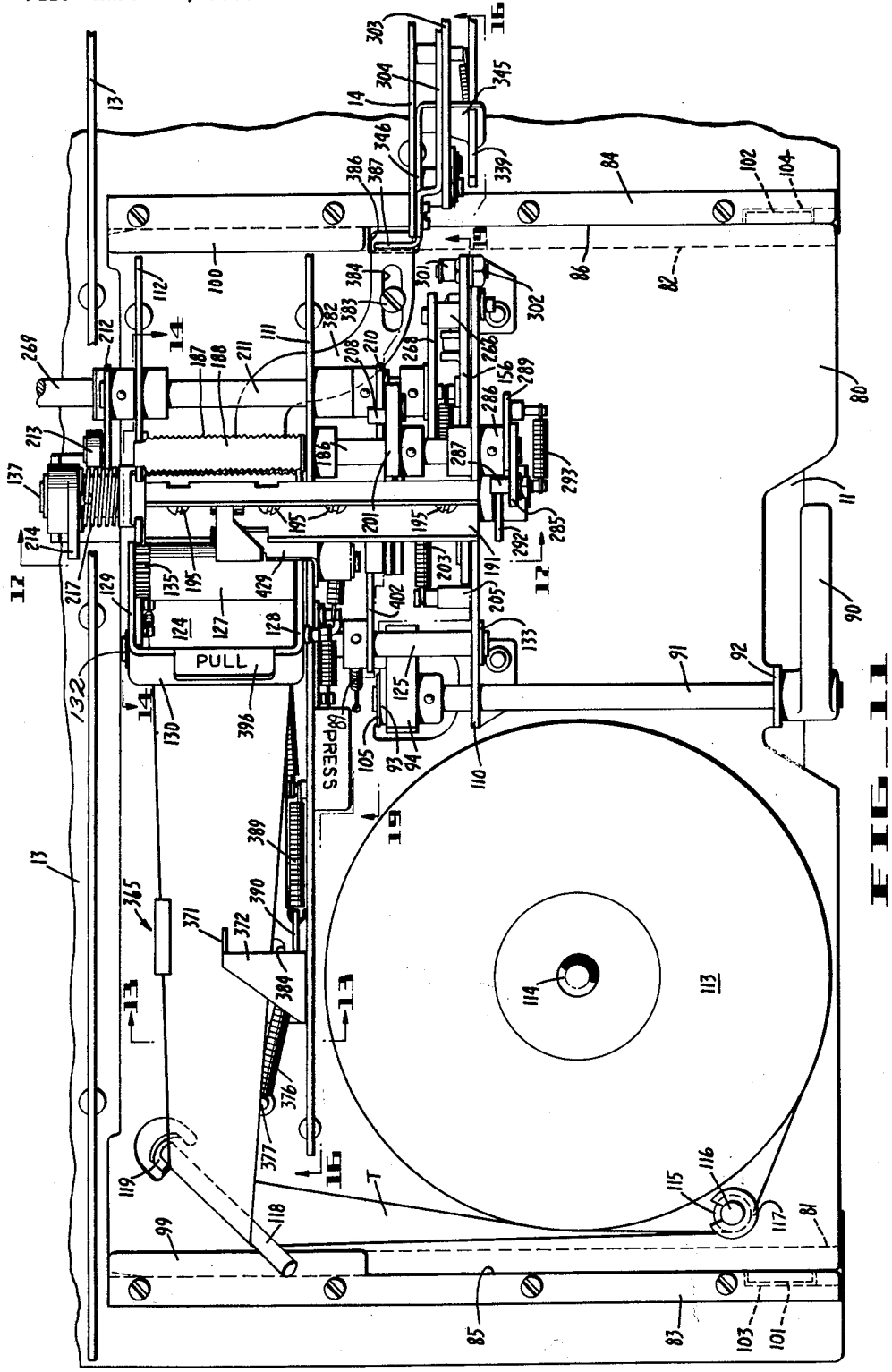
FIG. 11 is a plan view of the tape feed mechanism.

FIG. 27 is an elevational view showing the "dry tape" control key and a portion of the mechanism controlled thereby, the view being taken on the plane indicated by the line 27—27 of FIG. 23; and FIG. 28 is a sectional elevational end view of a portion of the moistening device showing the liquid level control chamber and the outlet therefor, the view being taken on the plane indicated by the line 28—28 in FIG. 26.

The invention as described herein is preferably shown as embodied in a postage metering machine of the type disclosed in the copending application of Ingemar H. Lundquist, Ser. No. 801,594, filed March 24, 1959. In the use of this type of postage metering machine, an envelope ("envelope" implying any ordinary type of mail matter), in passing through the machine, is postmarked by the impression thereon of one or more stamp indicia and the printed value of the postage indicia is subtractively registered in the descending register of the metering machine while the value of each postage impression made is accumulated in the ascending register of the machine. The "meter" portion 20 of the machine shown in FIG. 1 carries the two registers and can be removed from the machine for adjustment of the descending register by a postal official to represent an amount of prepaid postage. Following the reduction of the prepaid postage value to a predetermined amount, the machine becomes locked against further operation, necessitating a readjustment of the descending register to represent an additional prepaid postage value.

The postage metering machine shown in FIG. 1 and fully described in the afore-mentioned application Ser. No. 801,594, comprises generally the base portion 10, the cyclic clutch controlled power unit 15, and the postage meter unit 20.

The base portion 10 comprises generally the base plate 11 (FIG. 3) and the longitudinally disposed frame plate members 12 and 13 and auxiliary frame plate member 14 (FIG. 2) which serve to support various operating mechanisms of the machine. Enclosed within the cover 16 of the base portion 10 is the electric motor 17 secured on the base plate 11 and the motor-driven gear transmission mechanism 18 which becomes effective upon manipulation of the "on-off" switch 19 to cause a continuous operation of the endless belt 21 moving in a plane parallel to, and above, the top surface of the cover 16. In addition to controlling the operation of the endless belt 21, the gear transmission mechanism 18 also serves to control the operation of the cyclic clutch 22 (FIGS. 9 and 10) by means of a timing belt 23. Upon engagement of the clutch 22, a clutch-driven mechanism (not shown), enclosed within the power unit housing 15, serves to impart a synchronous cyclic rotation to two rotary printing drums, one of which is generally indicated at 27 (FIGS. 1, 4 and 5) and is suitably journalled in the framework within the power unit housing 15 and the other of which is generally indicated at 28 (FIG. 4) and is suitably journalled in the framework within the postage meter unit 20.

The rotary printing drum 28 carries the postage indicia die, while the auxiliary printing drum 27 (FIGS. 4 and 5) carries the town circle die 29, dater dies 30, bulk rate die 31 and the removable slogan die plate 32. The dater dies 30 and bulk rate die 31 are each selectively adjustable to print or non-print position under the control of the knurled knob 33 and, in a like manner, the slogan die plate 32 may be selectively adjusted from a print to a non-print position by a manipulation of the knurled knob 34. Knurled knobs 33 and 34 are freely mounted for independent manipulation on the outer extended end of the shaft 35, upon which the auxiliary rotary printing drum 27 is secured. The axes of the auxiliary printing drum 27 and the postage indicia printing drum 28 are parallel and the axial spacing of the drums is such that the impression made by each of the printing drums on an envelope or tape forms a complete postmark thereon. Each of the rotary printing drums 27 and 28 is provided with a similar roller 40 (FIGS. 4 and 6) which, in the full-cycle position of the drums, is in rolling contact with the upper running surface of the endless belt 21 and is positioned directly above respective impression rollers, or platens, 41 and 42 (FIGS. 3 and 4) which are normally spring-urged upwardly into rolling contact with the underside of the belt 21.

The endless belt 21 is carried by a pair of similar pulleys 43 and 44 secured on respective pulley shafts 45 and 46, journalled in the spaced parallel side members 47 and 48 of the yieldably supported conveyor cradle 49 (FIG. 2). In order to drive the endless belt 21, the gear 53 is secured on the drive shaft 54, journalled in frame member 13 and auxiliary frame member 14, and is driven in a clockwise direction (FIGS. 2 and 3) by motor 17 through the gear transmission mechanism 18. Gear 53 is enmeshed with the idler gear 55 which, in turn, is enmeshed with the gear 56 secured on pulley shaft 45, each of the gears 55 and 56 having a pitch diameter equivalent to that of the gear 53. Thus, upon energization of motor 17, pulley 43 is rotated in a clockwise direction, as viewed in FIG. 3, moving the top portion of the belt 21 to the right. Pulley 43 is normally urged upwardly to resiliently maintain belt 21 in engagement with pressure roller 57 (FIGS. 4 and 7) secured on shaft 58 journalled at its respective ends in each of similar brackets 59 mounted on the framework within the power unit housing 15. Similarly, pulley 44 is normally urged upwardly to resiliently maintain belt 21 in engagement with pressure roller 60 suitably mounted within the meter unit 20. Thus, an envelope or tape, in passing between the belt 21 and pressure rollers 57 and 60, is maintained in frictional engagement with the belt.

Referring to FIGS. 7, 9 and 10 and as explained above, the cyclic clutch 22 becomes effective, upon engagement thereof, to cause a synchronous cyclic rotation of the rotary printing drums 27 and 28, the peripheral speed of which is in timed relation to the surface speed of the belt 21. Clutch 22 is of a well-known construction and is rotatable in a counter-clockwise direction, as viewed in FIGS. 9 and 10. Normally, clutch 22 is retained in the full-cycle position shown by the engagement of the tooth 62, on the upwardly extended arm of bellcrank 63, with the shoulder 64 provided in the periphery of the clutch-engaging disk 65 carried by the driven side of the clutch. The clutch control bellcrank 63 is normally urged counter-clockwise (FIG. 10) into the clutch-disengaging position by means of spring 66, which also serves to resiliently maintain the shoulder 67, formed in the lower edge of clutch control link 68, in engagement with the formed-over ear 69 on the upwardly extended arm of bellcrank 63. At its right end, link 68 (FIG. 9) is pivotally mounted on arm 70 secured on shaft 71 suitably journalled in the framework of the machine and within the housing 15. At its outer end, shaft 71 carries pressure foot 72 (FIG. 7) pinned thereto and normally positioned adjacent the inner edge of the feed belt 21 and pulley 43.

In operating the device, an envelope is moved, flap side downward, into position to be frictionally grasped by the belt 21 between the belt and pressure roller 57 and, as the envelope is positioned thusly, the leading end thereof engages pressure foot 72, rocking shaft 71 counter-clockwise (FIG. 7). With the rocking of shaft 71, clutch control link 68 is moved to the right, as viewed in FIGS. 9 and 10, rocking bellcrank 63 clockwise to remove the tooth 62 from engagement with the shoulder 64 on clutch disk 65 to effect engagement of clutch 22. Upon engagement of clutch 22, a cyclic rotation of the auxiliary printing drum 27 and postage indicia printing drum 28 is initiated and, as the envelope reaches the printing station, the postmark impression is correctly positioned thereon and the belt 21 continues to advance the envelope to a suitable receiver.

In order to ensure the printing of a correctly positioned postmark impression on each envelope, irrespective of the length of the envelope, a single cycle of rotation of each of the rotary printing drums is effected, after which, cyclic clutch 22 is disengaged. Upon counter-clockwise rocking movement of the pressure foot 72 by the engagement of an envelope therewith (FIG. 7) and the endwise movement of the link 68 to the right (FIG. 10), the clutch control bellcrank 63 will be rocked clockwise to the clutch-engaging position and will be retained in this position for a period of time determined by the length of the envelope. However, substantially midway in the cycle of rotation of clutch 22, pin 73, carried by the driven side of the clutch, engages the end portion 74 of the link 68, rocking the link 68 clockwise to move the shoulder 67 from its engagement with ear 69 on bellcrank 63. Thereupon, spring 66 rocks bellcrank 63 counter-clockwise to move the tooth 62 into engagement with the peripheral edge of disk 65 and upon continued rotation of the clutch 22, the shoulder 64 of disk 65 moves into engagement with the tooth 62 thereby effecting a disengagement of the clutch to terminate rotation of the rotary printing drums. As each envelope passes through the machine, the amount of postage represented by the postmark impression thereon is registered subtractively in the descending register of the meter unit 20 and is accumulated in the ascending register of the unit, as fully described in the afore-mentioned application Ser. No. 801,594.

The machine is also provided with means whereby stamp impressions may be made on strips of tape passing successively through the machine for delivery thereafter, in a moistened or non-moistened state, for application on any type of mail matter. As in the case of the passage of each envelope through the machine, the amount of postage represented by each tape strip is likewise registered in the descending and ascending registers of the meter unit 20.

As explained hereinbefore, the invention is shown and described as being embodied in a postage metering machine of the type shown and described in the afore-mentioned copending application Ser. No. 801,594. However, it will be understood that the invention is adaptable for use in any type of printing device. As shown and now to be described, the tape control mechanism operates to feed the tape from a roll, or source of supply, to a position where it is severed to form strips of selective lengths, feeding the strips to a printing station and beyond, whereupon each printed strip is delivered in a moistened or non-moistened state as desired. The tape feed and cutting mechanism is adapted to be detachably mounted as a unit within the machine, and, as shown, when properly mounted for operation, it is in a position such that each severed strip of tape, or web, will thereafter be advanced to the printing station for an impression by each of the rotary printing drums 27 and 28.

The detachable portion of the tape control mechanism comprises a base plate 80 (FIGS. 4, 7, 11 and 12) which is slidably movable on the inwardly projecting flanges 81 and 82 of respective guideway blocks 83 and 84 secured in spaced-apart parallel relationship on base plate 11. Base plate 80 is substantially rectangular in shape and is of a length slightly less than the spacing between the vertically disposed parallel walls 85 and 86 of the respective guideway blocks 83 and 84, thereby preventing inaccurate alignment of the tape feed mechanism and the control mechanism therefor, as will be hereinafter described. Following the sliding movement of the base 80 and the mechanism mounted thereon into operative position within the machine, the base and the mechanism carried thereby is moved upwardly and becomes locked in the raised position against movement in either direction.

To move base plate 80 and the assembly thereon upwardly, a lever arm, or handle, 90 (FIGS. 4, 11 and 12) is provided and at its one end is secured on the outer end of a shaft 91 supported in each of ears 92 and 93 formed upwardly at a right angle to base plate 80. Near its inner end, shaft 91 carries a camming head 94 pinned or otherwise secured thereon adjacent the inner surface of the ear 93. Camming head 94 is provided with a rounded portion 95, the radius of which is such that when the free end portion of the handle 90 is in a horizontal position parallel with the base 80, the base will be raised its full extent of movement. A flat portion 96 is also provided on the camming head 94 and its surface becomes flush with the lower surface of the base plate 80, upon rocking movement of the handle 90 from the position shown in FIG. 4 counter-clockwise to a position wherein the free end of the handle 90 is perpendicular to the base plate 80. Thereupon, the base plate 80 will drop into engagement with the surface of the flanges 81 and 82 and may then be easily removed from the machine. Rocking movement of the handle 90 in a clockwise or counter-clockwise direction is limited by the respective engagement of a shoulder 97 or 98 on camming head 94 with the top surface of the base plate 80. A spring 89 is secured at its one end in an aperture in base plate 80 and is supported at its other end on a pin carried by camming head 94 and functions as a toggle to resiliently retain the head 94 in either of its two positions.

The rearward end portion of each of the guideway blocks 83 and 84 is provided with a flange 99 and 100, respectively, spaced from, and parallel to, the respective flanges 81 and 82. As the base plate 80 is moved to the raised position shown in FIGS. 4 and 7, the rearward portion of each of the respective ends thereof engages the lower surface of flanges 99 and 100 to maintain base plate 80 parallel with the horizontal base 11 of the machine. At the same time, each of a pair of lugs 101 and 102, projecting outwardly from the respective ends of the base plate 80 adjacent the forward edge thereof, is moved upwardly into respective recesses 103 and 104 in guideway blocks 83 and 84, thereby securing base plate 80 against movement within the guideways. Inasmuch as the handle 90 is pinned on the outer end of shaft 91 adjacent the outer surface of ear 92 and a snap ring 105 is secured in an annular groove in the other end of shaft 91 adjacent the outer surface of supporting ear 93, endwise movement of the shaft is prevented. Thus, the handle 90 not only serves, upon adjustment thereof, to raise and lower base plate 80, but may also be used as a means for inserting the base plate assembly into the machine or, when in its lowered position, to remove the assembly from the machine.

Upon movement of the base plate 80 inwardly of the machine on flanges 81 and 82, rocking of the handle 90 to the locking position shown in FIG. 4 is prevented until the base plate and the mechanism carried thereby is operatively positioned relative to the belt 21. For this purpose, an embossment 106 on base 11 is disposed intermediate guideway blocks 83 and 84 parallel therewith and is provided with a notch into which the camming head 94 may be rocked upon proper placement of the base plate 80.

As stated hereinbefore, base plate 80 serves to mount the roll of tape, or webbing, mechanism for feeding a predetermined length of tape and a cutting knife effective to thereafter sever the tape, forming a strip, or stamp, of either of two predetermined lengths. The tape feed and cutting mechanims are supported in spaced parallel frame members 110, 111 and 112 secured in a vertical position on base plate 80, while the tape roll 113 is freely mounted on a vetrical spindle 114, also secured on base plate 80. Frame member 110 serves also as a support for shaft 91 intermediate the ends thereof. The tape T is led from the supply roll 113 over a roller 115 revolvable about a vertically disposed spindle 116 secured on base plate 80. A snap ring 117 is secured in position adjacent the upper end of the spindle 116 and serves to retain roller 115 on the spindle and to prevent tape T from riding up on roller 115. In passing over the roller 115, the gummed surface of the tape T is in contact with the roller from whence the tape is led over a peg 118 (FIGS. 11 and 12). Peg 118 is secured at its lower end on an ear 119 formed angularly upwardly from the base plate 80 so that the peg 118 extends upwardly at an angle of approximately 45° relative to the base plate 80 and at approximately 45° diagonally with respect to the rearward and left edges of the base plate. The angularity of the peg 118 relative to the base plate 80 and also the source of tape supply is such that, following the passage of the tape T over the peg 118, the tape is turned at right angles to the direction of supply as it is led into the feed mechanism, with the gummed surface now becoming the lower surface of the tape. After passing over peg 118, tape T passes beneath, and in contact with, a roller 124 rotatably mounted upon a shaft 125 supported in frame members 110 and 111 (FIGS. 7, 11 and 14). The advancement of the tape T is upwardly from roller 124 and is effected by means of a pair of power-driven feed rollers 126 and 127, coacting one with the other, to move the tape to the cutting station where it is severed to form strips of predetermined lengths.

Roller 124 on shaft 125 is positioned between, and with its ends adjacent, the inner surface of respective parallel legs 128 and 129 of a substantially U-shaped bracket 130. Each of the legs 128 and 129 of bracket 130 is provided with an aperture adjacent its lower end for suitably supporting bracket 130 on shaft 125. A similar key portion 131 (FIG. 14) projects inwardly from the inner periphery of the aperture in each of the legs 128 and 129 of bracket 130 for engagement in a keyway extending axially of shaft 125. Thus, upon a clockwise rocking movement of the bracket 130 from the active position thereof shown in FIG. 14 to the inactive position shown in FIG. 15, shaft 125 will likewise be rocked for a purpose to be described hereinafter. Leg 128 of bracket 130 is positioned adjacent frame member 111 and endwise movement of shaft 125 or bracket 130 is precluded by each of a pair of similar snap rings 132, 133 (FIG. 11) engaged in suitable annular grooves within shaft 125 and contiguous with the outer surface of leg 129 of bracket 130 and the outer surface of frame member 110, respectively.

As stated above, roller 124 is in rolling contact with the top surface of tape T, from whence the tape moves upwardly between feed rollers 126 and 127, the cooperation of feed rollers 126 and 127 serving to frictionally control intermittent movement of the tape. The cooperation between feed rollers 126 and 127 to effect intermittent feeding of the tape T from the source of supply 113 is under the control of a pair of gears 134 and 135 (FIG. 14). The feed roller 126 is secured on a shaft 137 journalled in suitable bearing bushings in each of frame members 110, 111 and 112 and comprises a drum, the peripheral surface of which is encompassed by a suitable frictional material, such as rubber. At its one end, feed roller 126 carries the gear 134 concentric therewith and secured thereon by any suitable means, such as screws 138 (FIG. 14), and at its other end carries a disk 139 concentric therewith and secured thereon by similar screws 140 (FIG. 7), for a purpose later to be described.

During the operation of the tape feed mechanism, gear 134 is enmeshed with the gear 135 secured on one end of roller 127 which, in turn, is secured on a shaft 136 journalled at its ends in the respective legs 128 and 129 of U-shaped bracket 130 adjacent the upper end thereof. Referring to FIGS. 14 and 16, U-shaped bracket 130 is normally urged counter-clockwise in FIG. 14, under the influence of a relatively strong spring 144, into the active position thereof wherein gear 135 is enmeshed with gear 134. Spring 144 is supported at its one end on a pin 145 secured on frame member 111 and, at its other end, is supported on a pin 146 carried by a downwardly extended portion 147 of leg 128 of bracket 130. In order to obtain sufficient frictional contact with tape T, the peripheral surface of roller 127 is preferably covered with a cylinder of rubber similarly to feed roller 126 and, in operation, the strength of the spring 144 is such that sufficient pressure is applied by roller 127 to ensure uninterrupted feeding of tape T from the source of supply 113. The degree of contact pressure of feed roller 126 and roller 127 with the respective surfaces of tape T is determined by the pitch diameter of the enmeshed gears 134 and 135, the pitch diameter of each gear being only slightly less than the outside diameter of the respective feed roller 126 and roller 127 and such that the peripheral speed of the roller 127 is substantially equal to that of feed roller 126.

During each intermittent operation of the tape feed mechanism, clockwise rotation of feed roller 126 and counterclockwise rotation of roller 127 (FIG. 7) will effect the feeding of tape T from the supply roll 113, as stated hereinbefore. Following initiation of operation of the endless belt 21 by manipulation of control key 19 (FIGS. 1 and 2), a selective depression of either of control keys 150 or 151 will effect an approximate 145° angular rotation of feed roller 126 (FIG. 7) to move tape T through a guide block, generally indicated at 152, and across a rotary cutter device, generally indicated at 153. From the cutter device 153, the leading end of the tape is advanced to a position wherein it is frictionally grasped by feed belt 21 between the belt and pressure roller 57. Also, near the end of the initial 145° increment of rotation of feed roller 126, engagement of the cyclic clutch is effected to cause a cyclic rotation of each of the printing drums 27 and 28. Immediately upon the frictional engagement of the tape T with the endless belt 21, the drive for feed roller 126 is disabled and belt 21, in cooperation with pressure roller 57, continues the movement of the tape with the feed roller 126 turning freely for either an additional angular rotation of 35° or 215°, as desired. The additional 35° rotation or 215° rotation of feed roller 126, following the initial 145° increment of rotation thereof, is selectively predetermined by mechanism to be described hereinafter. Following either the 180° rotation or a complete revolution of the feed roller 126, the cutting device 153 becomes effective to sever the tape, thereby providing a strip of predetermined length which is thereafter advanced by the feed belt 21 to the printing station for a postmark impression by each of printing drums 27 and 28.

Referring now to FIGS. 17, 18, 19 and 20, the initial rotation of feed roller 126 is under the control of a rack 156 and pinion 157. Rack 156 is mounted adjacent frame member 110 and is supported for reciprocatory movement thereon by means of pins 158 and 159 secured on frame member 110 and engaged in respective elongated parallel slots 160 and 161. Rack 156 is normally retained in the rightmost or inactive position shown in FIG. 18 by means of a spring 162, supported at its one end on a pin 163 on rack 156 and at its other end on the pin 159 secured on frame member 110. In the normally inactive position of the rack 156, an ear 164 formed at right angles to the lower portion of the rack is resiliently maintained by spring 162 in engagement with a snubber 165, preferably of rubber, carried by a bracket 166 secured on frame member 110. Pinion 157 is enmeshed with the teeth of the rack 156 and is rotatably mounted adjacent the inner surface of frame member 110 on feed roller shaft 137. Upon movement of rack 156 to the left, from the normally inactive position shown in FIG. 18, by an actuating mechanism, generally indicated at 170 (FIG. 3) and to be described hereinafter, pinion 157 is rotated in a clockwise direction (FIG. 18) to impart a similar clockwise rotation to shaft 137 and feed roller 126.

The clockwise rotation of pinion 157 is transmitted to shaft 137 by means of a coil spring-type clutch 171, an actuating disk 172 and a driven disk 173. The actuating, or driver, disk 172 and driven disk 173 are of equal diameter and each is provided with a pair of similar substantially V-shaped notches 174, 175 and 176, 177, respectively, in the peripheral surface thereof. Notches 174, 175 and 176, 177 of respective disks 172 and 173 are diametrically opposed and, as will be described hereinafter, the notches 174 and 175 of disk 172 cooperate with respective notches 176 and 177 in disk 173 to effect operation of the cutter mechanism 153 in either of two rotated positions of the disks. Driven disk 173 is secured on shaft 137 (FIG. 17), whereas driving disk 172 is carried by a hub 178 rotatable on shaft 137 and is positioned adjacent driven disk 173 for cooperation therewith. As stated above, rotation of the pinion 157 is transmitted to disk 172 by the spring clutch 171 which is tightly coiled in a clockwise direction, as viewed from the right in FIG. 17, and is supported on a reduced diametral portion of the hub 178 of disk 172 and on the hub of pinion 157, the diameter of the hub of the pinion 157 being equal to that of the reduced portion of hub 178 and substantially that of the inside diameter of the coiled spring 171. One end of the spring 171 is in abutting relation to a shoulder formed on the hub 178, while the other end thereof abuts the inner surface of the pinion 157. Thus, it becomes apparent that upon clockwise rotation of pinion 157 (FIG. 18), coil spring 171 is tightened to provide a frictional bond between the spring and the hub of the pinion 157 and the hub 178, thereby effecting a similar rotation of driving disk 172. However, inasmuch as spring 171 is coiled in a clockwise direction, pinion 157 may be rotated counter-clockwise (FIG. 18) independently of disk 172. Similarly, rotation may be imparted to disk 172 in a clockwise direction independently of pinion 157, as will be later explained.

A driving connection is provided between the disks 172 and 173 to enable a clockwise rotation of the feed roller 126 (FIG. 7) upon rotation of pinion 157 by the rack 156 as it is moved from its normally inactive position. For this purpose, an arcuate slot 180 in the driven disk 173 (FIGS. 18, 19 and 20) is engaged by a pin 181 projecting outwardly from the face of the juxtapositioned driving disk 172 so that upon clockwise rotation of the pinion 157, driving disk 172 will be effective to impart a similar rotation to disk 173 and, therefore, feed roller 126. In the normal "at rest" position of the tape feed mechanism, pin 181 on driving disk 172 abuts the counter-clockwise end of the arcuate slot 180 in disk 173, as seen in FIG. 18. It will be noted that with the pin 181 so positioned in slot 180, the notches 174 and 175 of disk 172 are aligned with the respective notches 176 and 177 of disk 173. Immediately upon clockwise rotation of pinion 157, disk 172 is likewise rotated and following a lost motion of approximately 35° in the rotation of disk 172, pin 181 carried thereby engages the clockwise end of the slot 180 (FIG. 19) to immediately effect a clockwise rotation of driven disk 173, shaft 137 and tape feed roller 126. Continued clockwise rotation of pinion 157, disk 172 and disk 173 will move the V-notch 174 of disk 172 to an angularly rotated position approximately 180° displaced from the position thereof shown in FIG. 18. At the same time, the V-notch 176 in disk 173 will be moved to an angularly rotated position approximately 145° from the position thereof, likewise shown in FIG. 18. Following the 180° and 145° rotation, respectively, of the disks 172 and 173, rack 156 is released to be returned to the "at rest" position (FIG. 18) under the influence of spring 162.

During the initial part of the return movement of the rack 156 and the resultant counter-clockwise rotation of pinion 157 (FIG. 18), disk 172 is similarly rotated to move the pin 181 from its engagement with the clockwise end of the slot 180 into engagement with the counter-clockwise end thereof due to the frictional contact of the respective ends of the spring 171 with pinion 157 and the shoulder on hub 178 of disk 172. Thereupon, the diametrically opposed notches 174 and 175 of disk 172 become aligned with the respective diametrically opposed identical notches 176 and 177 of disk 173. Counter-clockwise rotation of the disk 173 and tape feed roller 126 is prevented by the employment of an antibacklash spring 182 (FIG. 17) which is coiled counter-clockwise, as viewed from the right in FIG. 17, about the shaft bearing bushing in frame member 111 and the reduced diametral portion of the hub 179 of disk 173. Spring 182 is compressed between frame member 111 and the shoulder formed on the hub 179 and has an inside diameter slightly greater than the outside diameter of the shaft bearing bushing and the reduced portion of the hub 179 so that, substantially immediately upon an attempt to rotate disk 173 in a counter-clockwise direction, spring 182 is tightened, thereby frictionally locking the disk against rotation in that direction. Therefore, as pin 181 on disk 172 engages the counter-clockwise end of the slot 180 in disk 173, further rotation of the disk 172 in a counter-clockwise direction is precluded. However, pinion 157 will continue to rotate freely, thereby enabling rack 156 to return to the "at rest" position shown in FIG. 18 under the influence of spring 162.

Subsequent to the initial increment of rotation of the disks 172 and 173 and the realignment of the respective corresponding notches 174, 176 and 175, 177, rotation of the tape feed roller 126 is continued to complete either 180° rotation or a full revolution of the disks 172 and 173, whereupon means becomes effective to terminate rotation of the disks and to control operation of the cutter device 153, as will now be described.

As the rack 156 is moved to the left its full extent from the position shown in FIG. 18 to the position shown in FIG. 20, the V-notch 177 in disk 173 is rotated clockwise an angular extent of approximately 145° to the position shown in FIG. 20 and, during the immediate return thereafter of the rack 156 to the "at rest" position shown in FIG. 18, the V-notch 175 in disk 172 becomes aligned with notch 177 in the disk 173. During this initial rotation of disk 173, tape feed roller 126 advances the leading end of the tape through guide block 152 and cutter device 153 into frictional engagement with the endless belt 21 (FIG. 7), whereupon advancement of the tape is continued by belt 21, between the belt and pressure roller 57, thereby drawing the tape from its source of supply 113 and effecting an additional angular clockwise rotation of the feed roller 126. This additional angular rotation of tape feed roller 126 is of the extent of approximately 35° and serves to complete 180° of rotation of the disks 172 and 173, moving the aligned V-notches 175 and 177 into the position represented by notches 174 and 176 in FIG. 18. Immediately upon completion of the 180° rotation of the disks 172 and 173, the aligned notches 175 and 177 become effective to enable operation of the cutter device 153 to sever the tape, providing a strip, commonly referred to as a "short" tape, which is thereafter advanced through the printing station and is selectively dispensed at the right end of the machine (FIG. 1) in a moistened or non-moistened state.

In the embodiment shown, the cutter employed is preferably of the type, the two members of which have intermeshing serrated edges. In operation, this type of cutter has the distinct advantage of allowing the paper to follow the sinuous line of cleavage between the serrated edges of the two members so that the strip will be cut cleanly when the members are sharp, or will be cleanly torn apart when they are dull. Referring now to FIGS. 7, 8, 11 and 12, the cutter device 153 comprises a cutter rod 186, one end portion of which is threaded as at 187, and the other end portion of which is of a reduced diameter and serves to journal the cutter rod 186 in suitable bearings in each of frame members 110 and 111. At its outer end the threaded portion 187 is cradled in a semi-circular notch in the upwardly inclined edge of frame member 112, providing additional support for cutter rod 186. In order to provide a cutting edge, the threaded portion 187 of rod 186 is cut away, as at 188, providing a flat surface extending axially the length of the threaded portion 187. In operation, the threads of the threaded portion 187 of rod 186 are adapted for engagement with a series of teeth 190 provided along the upper edge of a cutting blade, or knife, 189 carried by the guide block 152. The flat surface 188 is tapered from each end of the threaded portion 187 toward the center thereof to give a shear to the cutting edge upon its engagement with the teeth 190 of the cutting blade 189.

In addition to cutting blade 189, guide block 152 also comprises an auxiliary guide member 192 (FIG. 8) and a supporting plate 193. Plate 193 extends parallel to the axis of the cutter rod 186 which, in turn, is axially parallel to the feed roller shaft 137. At its ends, supporting plate 193 is secured in suitable notches in the similarly angularly disposed edge surfaces of respective frame members 110 and 112 and is similarly supported intermediate its ends in frame member 111. The cutting blade 189 is positioned on the supporting plate 193 with the lower surface of the blade in contiguity with the top surface of the plate. However, a portion of the lower surface of the cutting blade 189 is cut away, providing a channel of sufficient length and depth to permit the passage of the tape therethrough during a feeding operation. The auxiliary guide member 192, in turn, is positioned between the lower surface of the web portion of an inverted channel member 191 and the top surface of cutting blade 189 so that an offset projection 194 thereof, having a width substantially equivalent to that of tape T, lies in a plane parallel to, and spaced from, supporting plate 193 to permit the passage of the tape therebetween. Each of the members 191, 192 and cutting blade 189 is secured together as a unit by any suitable means, such as screws 195. As viewed from the right in FIG. 11, the pair of adjacent right-hand screws 195 pass through suitable apertures in the web of channel member 191 and in auxiliary guide member 192 and are threaded into cutting blade 189. The left-hand pair of adjacent screws 195 not only pass through suitable apertures in the web portion of channel member 191 and auxiliary guide member 192, but also pass through similar apertures in cutting blade 189 and supporting plate 193 to be threaded in a hexagonal spacer rod 196 (FIG. 7) supported between frame members 110 and 111. Thus, the guide block unit 152, including the supporting plate 193, is secured on the frame members 110, 111 and 112 to maintain teeth 190 in the cutting blade 189 in cooperative relation with the threaded portion 187 of cutter rod 186. To further ensure the proper relationship of the threaded portion 187 with the teeth 190 of cutting blade 189, a shoulder formed at each end of the threaded portion 187 abuts the inner surface of the respective frame members 111 and 112, thereby preventing endwise movement of cutter rod 186.

In the normal "at rest" position of rack 156 and disks 172 and 173 (FIG. 18), wherein the notches 174 and 175 of disk 172 are aligned with the respective notches 176 and 177 of disk 173, the cutting edge of the threaded portion 187 is in active engagement with the teeth 190 of the cutting blade 189, as seen in FIG. 8. However, during the initial movement of the rack 156 to the left, as viewed in FIG. 19, and upon approximately 35° rotation of disk 172, means are brought into play to rock the cutting edge of the threaded portion 187, counter-clockwise as viewed in FIG. 8, to the position thereof shown in FIG. 19, wherein the flat surface 188 of threaded portion 187 lies in a plane parallel with, and slightly below, the top surface of the supporting plate 193 to permit the passage of tape T over the surface 188. For this purpose an arm 201 (FIGS. 11, 12, 18, 19 and 20) is secured on cutter rod 186 intermediate frame members 110 and 111 and has a nose portion 202 which, under the influence of a relatively strong spring 203, is normally urged into either the aligned notches 174 and 176 or 175 and 177 of respective disks 172 and 173 following each 180° rotation of the disks. Spring 203 is supported at its one end on a pin 204 on arm 201 and at its other end on a stud 205 on frame member 110. Arm 201 is of a thickness equivalent to the combined thicknesses of the disks 172 and 173 adjacently mounted on feed roller shaft 137 so that, upon an angular displacement of the notch 174 or 175 relative to the corresponding notch 176 or 177 in the respective disks 172 and 173, the nose 202 of arm 201 will ride on the periphery of one disk or the other, or both, thereby maintaining the cutter portion 187 in its inactive position.

As explained hereinbefore, immediately upon actuation of rack 156 to the left from the "at rest" position shown in FIG. 18, disk 172 is initially rotated approximately 35° in a clockwise direction, whereupon pin 181 on the disk 172 is moved into engagement with the clockwise end of the notch 180 in disk 173. During this initial rotation of the disk 172, an inclined edge of either the notch 174 or notch 175 therein becomes effective to rock arm 201 counter-clockwise to the position shown in FIG. 19, thereby rocking the cutting edge of the threaded portion 187 to its inactive position. Thereafter, both disks 172 and 173 rotate together in a clockwise direction as the rack 156 is moved to the left its full extent to the position shown in FIG. 20. During this phase of the operation, disk 172 is rotated 180°, while disk 173 and, therefore, tape feed roller 126 receive an angular rotation of 145°, thereby moving the leading end of the tape T across the flat surface 188 of the threaded portion 187 of the cutter and into frictional contact with belt 21 between the belt and pressure roller 57 (FIG. 7). Also, during this phase of the operation, the nose 202 of arm 201 rides on the peripheral edge of the disks 172 and 173, maintaining the cutting edge of the threaded portion 187 in its inactive position. At the same time, the notches 175 and 177 of respective disks 172 and 173, assume the relative position shown in FIG. 20 wherein notch 175 is advanced 35° clockwise from notch 177. Thereafter, spring 162 becomes effective to return rack 156 to its normally inactive position and the disk 172 rotates counter-clockwise sufficiently to move the pin 181 into engagement with the counter-clockwise end of the slot 180 and to align notch 175 with notch 177 in disk 173. This counter-clockwise rotation of the disk 172, it will be recalled, is by virtue of the frictional engagement of the ends of the spring 171 with pinion 157 and the shoulder on the hub 178 of disk 172. Simultaneously with the return of the rack 156, belt 21 becomes effective to continue the movement of tape T, drawing the tape over feed roller 126 thereby effecting continued clockwise rotation of the feed roller 126 and a similar rotation of disks 172 and 173. As the feed roller 126 and disks 172 and 173 complete 180° of rotation, the aligned notches 175 and 177 move into the position shown in FIG. 18, whereupon the relatively strong spring 203 becomes effective immediately to rock the arm 201 clockwise, moving the nose 202 thereof into the aligned notches 175 and 177. Upon engagement of the nose 202 of arm 201 in the aligned notches of the disks 172 and 173, rotation of the disks and feed roller 126 is terminated and the force exerted by the spring 203 is sufficient to cause the serrated edge of the threaded portion 187 to sever the tape, forming a short strip which is thereafter carried by means of belt 21 to, and beyond, the printing station for an impression by each of printing heads 27 and 28.

It, therefore, becomes apparent that upon each actuation of the rack 156 from the position shown in FIG. 18 and return, and upon re-engagement of the nose 202 of arm 201 in either pair of aligned notches 174 and 176 or 175 and 177, following 180° rotation of the disks 172 and 173, a "short" tape is provided which, upon advancement by belt 21 through the printing station, will receive a postage impression from auxiliary print head 27 and the indicia print head 28. This same actuation of rack 156 may be utilized, when desired, to enable the operation of the tape feed mechanism for the provision of a "long" tape, which, upon severance thereof is advanced by the belt 21 through the printing station to receive a slogan impression from the auxiliary print head 27 in addition to the postage impression from each of the print heads 27 and 28.

In order to provide a "long" tape, the operation of arm 201 is held in abeyance following the actuation of rack 156 and the completion of the 180° angular rotation of the disks 172 and 173, thereby delaying operation of the cutting device 153 until the disks 172 and 173 complete one revolution. For this purpose, arm 201 (FIGS. 11, 12 and 19) carries a pin 208 engaged in a bifurcation 209 in the upper end of a vertically disposed arm 210 secured on one end of a shaft 211 journalled in suitable bearings in each of frame members 111 and 112. At its other end, shaft 211 carries an arm 212 secured thereon with its hub adjacent frame member 112. Adjacent its free end, arm 212 carries a roller 213 which is adapted for engagement, selectively, with the peripheral surface of a cam 214 having a hub 216 freely mounted for axial movement on the outer end of feed roller shaft 137 extending through a suitable aperture 215 (FIG. 9) in frame member 13. The hub 216 (FIG. 17) of cam 214 extends to either side of the cam with the right-hand portion of the hub having a smaller diameter than that of the left-hand portion. The construction of the cam 214 is such that a portion of the peripheral edge thereof is tangential with the peripheral surface of the left-hand portion of the hub 216 forming a flush surface therewith of an angular extent of approximately 45°. Normally, cam 214 is maintained in the inactive position shown in FIG. 17 by means of a compression spring 217 supported at its respective ends on the peripheral surface of the right-hand portion of hub 216 and on the reduced diametral portion of the feed roller shaft bearing in frame member 112. While in its inactive position, cam 214 is locked against rotation by the engagement of a suitable aperture in the cam with a laterally extended pin 218 carried by the vertical offset end of a bracket 219 secured by any suitable means, such as screws 220, on frame member 112.

In its normally locked position, cam 214 is to the right of the roller 213 (FIGS. 9 and 12) so that arm 212, shaft 211 and arm 210 may rock without restraint, thereby enabling arm 201 to terminate rotation of feed roller 126, following each 180° angular rotation of disks 172 and 173, whereupon, it will be recalled, cutter rod 186 is rocked to provide a "short" tape. If a "long" tape is desired, cam 214 is axially moved downwardly in FIG. 11, or to the left in FIG. 9, into alignment with the roller 213 on arm 212 thereby compressing spring 217. Thereupon, cam 214 becomes keyed to tape feed roller shaft 137 for rotation therewith. During the initial 180° angular rotation of shaft 137, the cam 214 becomes effective to maintain the nose 202 of arm 201 out of engagement with the corresponding pair of aligned notches in the disks 172 and 173. Thereafter, as the shaft 137 and feed roller 126 nears the end of the second 180° angular rotation thereof, i.e., as the roller 126 is completing one revolution, the cam 214 enables the operation of the arm 201 to terminate rotation of the roller 126 and to operate cutter rod 186.

In order to key the cam 214 to shaft 137, a pin 221 (FIG. 17) extends diametrically through the shaft with its respective ends projecting sufficiently beyond the circumferential surface of the shaft to be engaged by diametrically opposed notches 222 in the right-hand portion of the hub 216 of cam 214. The depth of the diametrically opposed notches 222 in the hub of the cam 214 is sufficient to enable the removal of the aperture in cam 214 from its engagement with pin 218. Similarly, the length of the pin 218 is such that, upon movement of cam 214 to the right (FIG. 17), the notches 222 engage pin 221 before the cam is disengaged from pin 218. Thus, it becomes apparent that following the engagement of the notches 222 with the pin 221 and, upon completion of one revolution of feed roller 126, the cam 214 cannot be angularly displaced to prevent re-engagement of the aperture in the cam with pin 218.

Following the lateral movement of the cam 214, to the right in FIG. 17, or downwardly in FIG. 11, into alignment with roller 213, a subsequent actuation of rack 156 first rotates disk 172 approximately 35° in a clockwise direction to rock arm 201 and, therefore, the threaded portion 187 of the cutter rod 186 to the inactive position shown in FIG. 19. Thereafter, continued actuation of the rack 156 causes disk 172 to become effective to impart an angular rotation of approximately 145° to disk 173 and, therefore, tape feed roller 126. The rack 156 is then returned to its inactive position, under the influence of spring 162, aligning the corresponding notches 174, 176 and 175, 177 of the disks 172 and 173 and, simultaneously therewith, feed belt 21 draws tape T to the right, as viewed in FIG. 7, continuing the clockwise rotation of the tape feed roller 126 and disks 172 and 173. Following the alignment of the corresponding pairs of notches in disks 172 and 173 and prior to the completion of the first 180° angular rotation of feed roller 126, the high point on the cam 214 engages with the roller 213 to rock the nose 202 of arm 201 out of frictional engagement with the peripheral surface of the disks 172 and 173. The arcuate length of the high dwell of the cam 214 is such that, following the engagement thereof with roller 213, the arm 201 is retained in its inactive position for approximately 90° of the rotation of the feed roller 126. Thereafter, the cam 214 rotates out of engagement with roller 213, permitting spring 203 to effect a re-engagement of the nose 202 of arm 201 with the peripheral edge of each of the disks 172 and 173. Clockwise rotation of feed roller 126 and, therefore, disks 172 and 173 continues until one complete revolution thereof has been effected. At this time, the corresponding pair of aligned notches in the disks are positioned for engagement by the nose 202 of the arm 201, under the influence of spring 203, to terminate rotation of feed roller 126 and to rock cutter rod 186, thereby severing the tape. Thus, the tape strip, or "long" tape, so provided is twice the length of the "short" tape.

The selective adjustment of the cam 214 from its inactive to its active position is under the control of the manipulative knob 34 (FIGS. 5 and 6) which, it will be recalled, controls the adjustment of the slogan die plate 32 to either the print or non-print position on the auxiliary printing head 27. As fully described in the afore-mentioned application Ser. No. 801,594, the die block 228 (FIGS. 5 and 6), upon which the slogan die plate 32 is removably mounted, is supported for lateral movement on stud 229 secured on one leg of U-shaped bracket 230 supported between each of circular end frames 231 and 232 which, in turn, are secured on shaft 35 for rotation therewith. Normally, die block 228 and the die plate 32 thereon are urged to the retracted, or non-print, position by means of compression spring 233. When in this position, the right-hand edge of each of cam portions 234 and 235, in each of the spaced parallel slots 236 in die block 228, is contiguous with the corresponding inclined surfaces 237 and 238 in each flange 239 of the channel slide 240. Upon manipulation of knob 34, the slide 240 is moved to the left to the position shown in FIG. 5 and each pair of inclined surfaces 237 and 238 becomes effective to move the slogan die plate 32 upwardly to the print position, compressing spring 233. A pair of pins 241 and 242 are secured in spaced parallel relationship on slide 240 and extend through similar elongated slots in one leg of U-shaped bracket 230, which slots are parallel with flanges 239 and serve to guide slide 240 in its movement. Pin 241 supports one end of spring 243, the other end of which is supported on spacer rod 244 and serves to normally urge slide 240 to the right in FIG. 5 to its inactive position. Pin 242 on slide 240 serves, as will now be described, to effect a lateral movement of the cam 214 to the left (FIG. 9) into alignment with roller 213.

At its outer end, pin 242 is formed to provide a diametral rib 248 engaging in a suitable keyway 249 in the shaft 35. The keyway 249 extends longitudinally of the shaft 35 parallel to the axis thereof and serves to confine a rod 250, one end of which abuts the rib portion of pin 242 and the other end of which abuts a collar 251 slidably mounted on shaft 35 (FIG. 9). The ends of the rod 250 are maintained in engagement with the rib on pin 242 and the collar 251 by means of a spring 252 coiled about shaft 35 and compressed between collar 251 and a disk 253, the hub of which is secured on shaft 35. It therefore, becomes apparent that upon movement of the slide 240 to the left from its inactive position, the slogan die plate 32 is moved to the print position shown in FIG. 5 and the pin 242 on slide 240 becomes effective to move the rod 250 to the right in FIG. 9, thereby imparting a sliding movement to the collar 251 on rod 35, compressing spring 252.

As the collar 251 is moved to the right in FIG. 9, means become effective to move the cam 214 from its normally inactive to its active position. For this purpose, a shaft 254 is suitably supported, adjacent its ends, in each of similar brackets 255 and 256 secured on frame member 13 and, at its respective ends, shaft 254 carries a vertically disposed arm 257 and a depending arm 258 secured thereon. The depending arm 258 comprises two similar members secured together, the lower ends of which are angularly offset in opposition, one to the other, forming a yoke. At its lower extremity, the angularly offset end portion of each member of the arm 258 is formed inwardly at a right angle thereto, providing an ear 259, the left-hand edge of which is in contact with a shoulder on the hub 216 of cam member 214. Similarly, the upwardly extended offset end of arm 257 is provided with an ear 260 formed at a right angle thereto and positioned between the face of a flange 261 integral with collar 251 and the face of the disk 253. As stated supra, the compression spring 252 normally urges collar 251 to the left (FIG. 9) and the spacing thereby provided between the flange 261 and disk 253 is sufficiently greater than the width of the ear 260 on arm 257 to permit the movement of the slide 240 (FIG. 5) from its inactive to its active position and rocking of the arm 257. Also, in addition to normally urging cam 214 to its inactive position (FIG. 17), compression spring 217 on shaft 137 serves to maintain the left-hand edge of the ear 260 on arm 257 (FIG. 9) in contact with the face of the flange 261. Thus, upon sliding movement of the collar 251 to the right in FIG. 9, cam 214 is moved into active alignment with roller 213 on arm 212 and will remain in the active position as long as slogan die plate 32 is maintained in its print position.

It will be recalled that a clockwise rotation of the clutch control shaft 71, as viewed from the lower end thereof in FIG. 9, serves in a well-known manner to effect an engagement of the cyclic clutch 22 (FIGS. 9 and 10) which controls a synchronous cyclic rotation of the auxiliary print head 27 and the postage indicia print head 28 in timed relation to the surface speed of the belt 21. It will also be remembered that a disengagement of clutch 22 is effected following each cyclic operation of the print heads 27 and 28. In order to effect engagement of clutch 22 and the operation, therefore, of print heads 27 and 28 in timed relation to the feeding of the tape T, a laterally extended pin 266 is secured on rack slide 156 (FIGS. 11, 12, 18, 19 and 20) and is engaged in a bifurcation 267 in the upper end of an arm 268 secured on one end of a shaft 269 journalled in suitable bearings in frame members 111 and 112. The other end of shaft 269 extends beyond frame member 112 through the aperture 215 in frame member 13 and carries an arm 270 (FIG. 9) secured thereon and rockable therewith in a clockwise direction, upon actuation of rack slide 156.

When the rack 156 is in its inactive, or "at rest," position, a laterally extended pin 271, secured on the free end of arm 270, is angularly displaced a predetermined distance from the upper edge surface of a lug 272, which lug extends laterally from the lower end of a slide 273 into the arcual path of the pin 271 for engagement thereby, upon clockwise rocking movement of the arm 270. Slide 273 is mounted for vertical endwise movement by the engagement of each of pins 274, carried by a laterally offset bracket 275, in suitable elongated slots in the slide 273. Bracket 275 is secured on frame member 13 and the laterally extended offset portion thereof is provided with a recess 276. A similar recess is provided in slide 273, corresponding to recess 276, and within the recesses in slide 273 and bracket 275, a spring 277 is disposed. At its upper end, spring 277 is supported in an aperture in the extended portion of bracket 275 and, at its lower end, is supported in an aperture in slide 273, spring 277 normally serving to urge slide 273 upwardly to the inactive position shown in FIG. 9.

In order to effect an engagement of the clutch 22, an arm 278 is secured on clutch control shaft 71 intermediate the ends thereof and, at its free end, carries a pin 279 engaged in a vertically disposed slot 280 in the upper end of the slide 273. Normally, pin 279 is in contact with the upper end of the slot 280 which is of a length sufficient to enable the rocking of the clutch control shaft 71 and, therefore, arm 278 by virtue of the operation of pressure foot 72 (FIG. 7) upon passage of an envelope, or other mail matter, into the metering device. It can be seen, however, that upon actuation of the rack 156 (to the left in FIG. 18), the initial part of the movement will cause a clockwise rocking movement of the arm 270 (FIG. 9) to engage pin 271 with the upper edge surface of the lug 272 of slide 273. Upon further movement of the rack 156 to the left for the limited extent of its travel, the pin 271 on arm 270 moves slide 273 downwardly, thereby imparting a clockwise rotation to the clutch control shaft 71 to effect engagement of the clutch 22. The extent of the lost motion of the pin 271, prior to its engagement with the upper edge surface of the lug 272, is sufficient to enable the tape feed roller 126 to move the leading edge of the tape into frictional engagement with the surface of the feed belt 21 between the belt and pressure roller 57. Thereafter, belt 21 continues the advancement of the tape until it is severed, whereupon, the severed strip of tape continues to be advanced to the printing station in proper timed relation to the rotation of the printing heads 27 and 28 for a postage impression thereon.

Following the actuation of the rack slide 156 to provide either a "short" or a "long" tape and, upon termination of the rotation of the feed roller 126 by the engagement of the nose 202 of arm 201 in either the corresponding notches 174 and 176 or 175 and 177 in disks 172 and 173 (FIG. 18), the impact of the nose 202 with the left-hand surface of the actively positioned notches would normally be sufficient, under the influence of spring 203, to cause an angular counter-clockwise rotation of the disks. This backlash of the disks 172 and 173 and, therefore, feed roller 126 would effect a retraction of the serrated end of the tape T from the cutting edge of the threaded portion 187 of cutter rod 186, so that a subsequent actuation of the rack 156 would either be insufficient to move the leading end of the tape into frictional engagement with the feed belt 21 or the severed strip of tape would be shorter than the desired length. In order to prevent such a condition, means are provided for locking the feed roller shaft 137 against rotation as the nose 202 of arm 201 is urged into the aligned notches of the disks 172 and 173.

Referring now to FIGS. 4, 11 and 12, an arm 285 is carried by a hub 286 secured on the outer end of cutter rod 186 adjacent frame member 110. At its lower end, the arm 285 carries a pin 287 extending to either side of the arm and secured in position by any suitable means, such as a threaded nut 288. The inwardly extended portion of the pin 287 becomes effective, upon a predetermined angular counter-clockwise rocking movement of the arm 285, to engage the perpendicular edge of an arm 289 freely mounted adjacent arm 285 in an annular groove in the hub 286 for movement independently of arm 285. At its lower extremity the arm 289 is provided with an ear 290 formed inwardly at a right angle thereto and adapted for engagement in either of a pair of diametrically opposed notches 291 in a disk 292 secured on the end of feed roller shaft 137.

It will be recalled that, upon the initial actuation of rack 156, the disk 172 becomes effective to rock arm 201 and, therefore, cutter rod 186 counter-clockwise to the inactive position shown in FIG. 19. Immediately prior to the disengagement of the nose 202 of arm 201 from the aligned notches in disks 172 and 173, the inwardly extended portion of the pin 287 engages arm 289 to disengage the ear 290 from the aligned notch 291 in the disk 292, thereby enabling rotation of shaft 137 upon continued actuation of the rack 156. Following either 180° or 360° rotation of the disks 172 and 173 and the movement of the aligned notches into position for re-engagement by the nose 202 of the arm 201, the clockwise movement of the arm 201 and shaft 186 imparts a similar movement to arm 285 (FIG. 4). Thereupon, a spring 293, supported at its one end on the outwardly extended portion of the pin 287 on arm 285 and at its other end on a pin on arm 289, causes the arm 289 to be rocked, moving the ear 290 into the aligned notch 291 of the disk 292. Thus, further rotation of shaft 137 and feed roller 126 is precluded immediately prior to the abutment of the nose 202 of arm 201 with the left-hand surface of the aligned notches in the disks 172 and 173.

As stated hereinbefore, the actuation of the rack slide 156, for the control of the tape feed mechanism, is enabled by the selective depression of either of control keys 150 or 151 and the subsequent operation of the power-driven actuating mechanism 170. Referring now to FIGS. 2, 3, 11, 21 and 22, following the sliding movement of the base 80 and the tape feed mechanism mounted thereon into its operative position within the machine, the base 80 is locked in place by means of the camming block 94 and the engagement of the lugs 101 and 102 in the respective recesses 103 and 104 in guideway blocks 83 and 84. When the base 80 is locked in its operative position, the tape feed roller 126 is accurately positioned for cooperation with feed belt 21, and a roller 301, secured by means of a threaded pin and nut 302 on the rightmost end of actuating rack 156, is aligned with a rack slide 303 of the power-driven actuating mechanism 170. Rack slide 303 lies adjacent a bracket 304 and is supported for endwise movement on bracket 304 by means of pins 305 and 306 engaged in elongated slots 307 and 308 in the slide 303. Each of the slots 307 and 308 is parallel with a series of teeth 309 along the upper edge of rack slide 303 and the slots are offset longitudinally, one with the other. Bracket 304 is provided with a pair of spaced parallel flanges 310 and an offset end portion 311 and is secured on frame member 14 by any suitable means, such as screws 312. The flanges 310 and offset end portion 311 of the bracket 304 serve to maintain rack slide 303 in parallel spaced relationship to frame member 14 and in the plane of a gear 313 secured on gear 53 carried by drive shaft 54. The diameter of the slot-engaging portion of pins 305 and 306 is identical, however, slot 308 is wider than slot 307, thereby enabling oscillatory movement of rack slide 303 about pin 305 to effect an engagement or disengagement of the rack teeth 309 with gear 313.

Normally, rack slide 303 is resiliently maintained in the inactive position shown in FIG. 3 by means of a relatively strong spring 317 supported at its one end in an aperture in rack slide 303 and at its other end on a pin 318 secured on frame member 14. In the inactive position of the rack slide 303, an ear 319, formed outwardly at a right angle thereto, abuts a limit stop 320, which is preferably of rubber and is carried by an angle bracket 321 secured in position adjacent bracket 304 by the screw 312. The influence of the spring 317 is such that rack slide 303 is not only urged to the right but is also urged clockwise about pin 305 to engage the upper edge and left end surface of slot 308 with the pin 306, whereby the rack teeth 309 of slide 303 are disengaged from the gear 313.

It will be remembered that, during an operation of the postage metering machine, feed belt 21 runs continuously upon manipulation of the "On-Off" switch 19 and is driven by shaft 54 through gear train 53, 55 and 56. During the continuous operation of the feed belt 21, a depression of either key 150 or key 151 will effect a rocking movement of the slide 303 counter-clockwise to engage the rack teeth 309 thereon with the continuously rotating gear 313, as seen in FIG. 21. Immediately upon engagement of the rack teeth 309 with the teeth of gear 313, slide 303 is moved to the left, as seen in FIG. 22, and following an initial predetermined lineal motion of the slide 303, an arcual end surface 322 of the slide 303 engages roller 301 on actuator rack 156 to effect rotation of tape feed roller 126. To control the engagement of the rack teeth 309 with gear 313, a rocker plate 326 (FIGS. 3, 21 and 22) is pivotally mounted on a headed pin 327 secured on frame member 14. Rocker plate 326 is positioned adjacent frame member 14 and carries a pair of rollers 328 and 329 which are spaced equidistantly from pin 327 and are diametrically opposed relative thereto. In width, the roller 329 is greater than that of roller 328 for a purpose to be hereinafter described. Plate 326 may be rocked into either of two positions, the inactive position shown in FIG. 3 or the active position shown in FIG. 21, each of which positions is determined, respectively, by the engagement of a shoulder 330 or a shoulder 331, formed by an arcuate recess in the defining edge of the plate 326, with a pin 332 on frame member 14. Upon rocking movement of the rocker plate 326, either the shoulder 330 or shoulder 331 is resiliently retained in engagement with pin 332 by means of a toggle spring 333, the respective inversely looped ends of which partially embrace a pin 334 on plate 326 and a pin 335 on frame member 14.

In the normally inactive position of the rocker plate 326, roller 328 rests in a clearance notch 336 in bracket 304 (FIG. 3) and an ear 337, formed outwardly at a right angle to the lower portion of plate 326, is substantially perpendicularly disposed, having the upper portion thereof engaged in a recess 338 in the lower edge of a horizontally disposed link 339. At its right-hand end, link 339 is pivotally mounted on a pin 340 on the lower end of a lever 341 secured on one end of a shaft 342 suitably journalled for rocking movement in each of frame members 13 and 14 (FIG. 23). At its other end, shaft 342 carries an upwardly extended arm 343 (FIGS. 23 and 27). Thus, a counter-clockwise rocking movement of either lever 341 (FIG. 3) or a clockwise movement of arm 343 (FIG. 27) is effective to move link 339 to the right to effect an engagement of the rack teeth 309 with the teeth of the gear 313.

Normally, link 339 is urged to the left (FIG. 3) by means of a spring 344 supported at its one end in a suitable aperture in the link 339 and at its other end on spring stud 318 on frame member 14. Adjacent its leftmost end, link 339 is supported for reciprocatory movement and is guided in its movement by the engagement thereof in a vertical slot in an angularly disposed right angle projection 345 of a lever 346 pivotally mounted adjacent frame member 14 on a pin 347. In the inactive position of the rocker arm 326 and link 339, as seen in FIG. 3, the bottom of the recess 338 in the link 339 rests on the upper edge of the ear 337 and the left-hand shoulder formed by the recess 338 abuts the face of the ear 337. Rocking movement of the lever 346 serves to disengage the left-hand shoulder of the recess 338 from ear 337 for a purpose to be hereinafter described.

The rocking of either the lever 341 or arm 343 and the resultant movement of link 339 to the right (FIG. 3) is controlled, respectively, by a depression of either key 151 or 150 (FIGS. 3, 23 and 27). A rounded nose 351 on the upper end of lever 341 and a similar rounded nose 351 on the upper end of arm 343 are maintained in engagement with a laterally projected portion of respective key stems 352 and 353 by spring 344. Each of the keys 150 and 151 is supported on the offset extension of the respective key stems 353 and 352 and project through suitable apertures in cover 16. The key stems 352 and 353 are identical and are mounted in a similar manner for endwise movement on respective frame members 13 and 14 by means of a pair of pin-and-slot connections 354. As either key 150 or 151 is depressed, link 339 is moved to the right (FIG. 3) and the left-hand shoulder of the recessed portion 338 of the link 339, by virtue of its engagement with the ear 337, effects a counter-clockwise rocking movement of the rocker plate 326 from its normally inactive to its active position. Upon the adjustment of the rocker plate 326 to its active position shown in FIG. 21, roller 329 engages the lower edge of the rack slide 303, rocking the slide counter-clockwise about the pin 305 to engage the rack teeth 309 of the slide with the continuously running gear 313. Thereafter, rocker plate 326 is resiliently maintained in its active, or rack-engaging, position by means of the toggle spring 333 and the diametrically opposed rollers 328 and 329 are positioned and retained in a horizontal plane parallel to the path of travel of the rack slide 303.

As the teeth 309 of the slide 303 are moved into engagement with the gear 313, the lower edge of the slot 308 in slide 303 engages pin 306 and the continuously running gear 313 becomes effective, immediately, to translate rack slide 303 to the left with the lower edge thereof moving on the surface of the wider roller 329. During the initial phase of the movement of rack slide 303 to the left, the leading chamfered end of a cam bar 355, secured adjacent the inner surface of the slide 303, engages roller 328 and, upon continued leftward movement of the slide 303, the lower surface of the bar 355 rides on roller 328 as the lower edge of the slide 303 continues to ride on roller 329. Substantially simultaneously with the engagement of the lower surface of the cam bar 355 with roller 328, the arcuate end 322 of slide 303 engages roller 301 on actuator rack 156 of the tape feed mechanism. Thereafter, continued movement of the rack slide 303 to the left causes actuator rack 156 to become effective to impart clockwise rotation to tape feed roller 126 (FIG. 7), moving the leading end of tape T into engagement with feed belt 21.

As rack slide 303 nears the completion of its leftward travel (FIG. 22), the downwardly inclined leading edge 356 of a depending portion 357 of the slide 303 is moved into engagement with roller 329 and becomes effective, upon further movement of the slide, to rock plate 326 clockwise. As roller 329 moves downwardly along the inclined surface 356 of the slide 303, roller 328 moves upwardly along the surface 358 of the beveled right end of cam bar 355. At the same time, the pin 334, supporting one end of toggle spring 333, is moved in a clockwise direction over center, so that immediately upon movement of roller 328 beyond the end of the cam bar 355, spring 333 becomes effective to restore rocker plate 326 to its inactive position. Upon return of rocker plate 326 to its inactive position, the roller 329 engages the horizontally disposed upper edge surface of a lateral projection 359 of the depending portion 357 of slide 303, thereby rocking the right end of the slide 303 in a clockwise direction about pin 305 to disengage rack teeth 309 from the gear 313. The spring 333 and rocker plate 326 are assisted in the disengagement of the rack 309 from gear 313 by the engagement of the upwardly inclined right end wall of the slot 308 in slide 303 with the pin 306, which engagement occurs as the pin 334 passes over center. Immediately upon release of the rack teeth 309 from the teeth of the gear 313, slide 303 is returned to its rightmost position under the influence of spring 317 while the cam bar 355 on slide 303 passes beneath roller 328. As the slide 303 returns to the inactive position shown in FIG. 3, spring 162 becomes effective to return rack 156 to the inactive position thereof shown in FIG. 18.

During the gear-driven translation of the slide 303 to the left (FIGS. 21 and 22), the free end of the link 339 is rocked upwardly about its pivot 340 to remove the left-hand shoulder, formed by recess 338 therein, out of active engagement with the ear 337 on rocker plate 326, if either key 150 or 151 is held depressed. A flange 360, provided on the lower end of the depending portion 357 of slide 303 and extending parallel to the rack 309, is adapted for engagement with an inclined edge of a distended portion 361 of link 339 to lift the link 339 and retain the link in a disabled condition during movement of rack slide 303 to the left. Hence, rocker plate 326 may be restored to its inactive position, upon termination of the leftward movement of rack slide 303, without interference from link 339. Following the disablement of link 339 and upon release of either of the manipulated keys 150 or 151, the left-hand shoulder formed by recess 338 will again assume its position shown in FIG. 3 relative to the ear 337.

Referring now to FIGS. 7, 11, 12, 13, 14 and 16, there are certain conditions under which the link 339 is rendered inoperative to effect engagement of the rack 309 with gear 313 for an operation of the tape feed roller 124, one such condition being that of the exhaustion of the tape supply 113 and the other being the condition wherein the tape is improperly threaded. Upon operation of the feed roller 126, tape T passes over a guide device, generally indicated at 365, positioned in the path of tape travel between peg 118 on base plate 80 and roller 124 rotatably mounted on shaft 125. The guide device 365 comprises an angle bracket 366 which is secured on base plate 80 by any suitable means, such as screws 367, and having one leg thereof disposed in vertical parallel relationship to frame member 111. A projected end portion 368 of the vertically disposed leg of bracket 366 extends angularly upwardly in a plane conforming with that of the tape T to support the tape as it turns at an angle to the axis of travel in passing from peg 118 to roller 124. In order to prevent runout or misalignment of the tape T, a channel member 369 is provided, having its one leg extended for the purpose of securing the member to the base 80 by means of the screws 367 and the other leg of the channel member extending parallel with the base 80 and above and in contact with tape T.

An elongated slot 370 is provided in the angular projection 368 of bracket 366 (FIGS. 7, 13 and 16) and is in registry with the lower extremity of a depending plunger arm 371 which is formed parallel with frame member 111 and at a right angle to a lateral extension 372 of a lever 373 pivotally mounted adjacent frame member 111 on a stud 374. At its lower end, lever 373 carries a laterally extended ear 375 having an aperture therein engaged by one end of a relatively strong spring 376, the other end of which is supported on a vertical stud 377 on base plate 80. Normally, the lower end of the plunger arm 371 is maintained in engagement with tape T, under the influence of the spring 376, thereby maintaining the lower surface of the tape in moving contact with the upper surface of the angular projection 368. Spring 376 is normally under tension, therefore, so that upon movement of the terminal end of the tape T to the right in FIG. 7 beyond the slot 370 in the angular projection 368, the plunger arm 371 will pass through the slot 370 to the position shown in FIG. 16.

Upon rocking movement of lever 373 in a clockwise direction (FIGS. 7 and 16), means are brought into play to prevent engagement of the rack teeth 309 of slide 303 with the teeth of the gear 313, upon depression of either of the control keys 150 or 151. For this purpose, a slide 382 is mounted for endwise movement on base plate 80 by the engagement of each of a pair of shoulder screws 383 (FIGS. 11 and 16) in similar elongated slots 384. The right-hand end portion of the slide 382 is laterally offset, extending through a suitable aperture 385 in frame member 111 and having its extreme right end normally projecting over an opening 386 provided in base plate 80. When in this position, the projected end of the slide 382 underlies a lateral projection 387 of the lever 346 which, it will be remembered, is rockably mounted adjacent frame member 14 on stud 347. As explained hereinbefore, the right angle projection 345 of lever 346 serves not only, by means of a vertical slot therein, to support the free end of the link 339, but also serves as a guide for the link in its reciprocatory movement. The projected end of the slide 382, therefore, serves to prevent a counter-clockwise rocking movement of the lever 346 (FIGS. 21 and 22) under the urgency of a spring 388 supported at its one end in a depending portion of the right angle projection 345 of lever 346 and at its other end on stud 335. As seen in FIG. 3, the lever 346, in its normal clockwise rocked position, enables spring 344 to maintain the left-hand shoulder of the recess 338 in link 339 in engagement with the ear 337 on rocker plate 326.

Normally, slide 382 is resiliently retained in its active position (FIGS. 7 and 11) by means of a spring 389, which is supported at its one end on stud 145 and at its other end is engaged in an aperture in a lobe formed on a vertically disposed flange 390 of slide 382. In the active position of the slide 382, the leading edge of an ear 391 extending upwardly of the flange 390 is in engagement with the laterally projected ear 375 on the lower end of lever 373. The tension of the spring 376 is greater than that of spring 389, thereby enabling spring 376 to overcome the influence of spring 389, when clockwise rocking movement of lever 373 is permitted. At the same time, the tensile strength of the tape T is sufficient to prevent penetration of the plunger arm 371 of lever 373 through the tape and into the aperture 370 in the angular projection 368. However, as the terminal end of the tape T passes to the right beyond the aperture 370, spring 376 becomes effective to immediately impart a clockwise rotation to lever 373 (FIG. 16), thereby moving slide 382 to the left, against the urgency of the spring 389, to remove the right end portion of the slide 382 from beneath the lateral projection 387 of the lever 346. Immediately, spring 388 imparts a counter-clockwise rocking movement to the lever 346, moving the lower extended end of the lateral projection 387 into the opening 386 in base plate 80. With this rocking movement of the lever 346, the free end of the link 339 is raised to the inactive position thereof shown in phantom line in FIG. 3. Thereafter, a depression of either key 150 or 151 will be ineffective to move rocker plate 326 from its inactive to its active position for the engagement of the rack teeth 309 with gear 313.

Following the disablement of the parts, base plate 80 and the tape feed mechanism mounted thereon are removed from the machine by opening an access door 395 in the cover 16 (FIG. 1), rocking locking handle 90 counter-clockwise to its vertical position (FIG. 4) and, thereafter, sliding the base 80 out of the machine on the flanges 81 and 82. It will be remembered that, as the locking handle 90 is rocked to its vertical position, the base plate 80 and mechanism thereon is dropped for engagement thereof with the flanges 81 and 82. As the base plate 80 is dropped into position for removal from the machine, sufficient clearance is provided to prevent interference by the lower end of the lateral projection 387 of lever 346.

Following the removal of the base plate 80 from the machine, U-shaped bracket 130 is rocked clockwise, as viewed in FIG. 14, to the position thereof shown in FIG. 15, thereby removing roller 127 from its contact with feed roller 126 and the pinion 135 from its meshing engagement with the gear 134. Thereafter, any portion of the tape remaining engaged between feed roller 126 and roller 127 may be easily removed by pulling the tape downwardly, or laterally outwardly, from the roller 126 and from between supporting plate 193 and cutting blade 189. To enable the rocking movement of the U-shaped bracket 130, a projection 396 extends angularly upwardly of the web portion of the bracket 130 and, when grasped between the thumb and forefinger, the bracket may be easily rocked against the urgency of the relatively strong spring 144. Upon rocking movement of the U-shaped bracket 130 to its inactive position, a pin 397 on the leg 128 of the bracket 130 engages in a notch in the upper edge of a horizontally disposed arm 398 of a bellcrank 399 pivotally mounted on a pin 400 secured on frame member 111. Normally, bellcrank 399 is urged clockwise (FIGS. 15 and 16) by means of a spring 401 which serves to resiliently retain the notch in the arm 398 in engagement with the pin 397, thereby locking bracket 130 in its rocked condition.

As the U-shaped bracket 130 is rocked to, and locked in, its inactive position (FIG. 15), cutter rod 186 is rocked counter-clockwise (FIG. 8) to move the cutting edge thereof below the tape passage formed between knife blade 189 and support plate 193. At the same time, slide 382 is moved to the right (FIG. 16), rocking lever 373 counter-clockwise sufficiently to enable the insertion of tape between the terminal end of the plunger arm 371 and the top surface of the angular projection 368. It will be remembered that U-shaped bracket 130 is keyed on shaft 125 which also carries an arm 402 secured thereon intermediate frame members 110 and 111 (FIGS. 11, 16 and 19). A rounded nose 403 formed upwardly at the free end of the arm 402 underlies an ear 404 projecting laterally from the end portion of the substantially horizontally disposed arm of lever 210. Thus, it can be seen that, upon movement of the bracket 130 to its inactive position, the arm 402 rocks lever 210 clockwise (FIG. 16) which, by virtue of the engagement of the bifurcation 209 with the pin 208 on arm 201, imparts a counter-clockwise movement to the arm 201 (FIG. 18). The nose 202 of arm 201 is thereby removed from its engagement in the aligned notches of the disks 172 and 173 and the cutting edge of the threaded portion 187 is rocked out of engagement with the serrated edge of the knife blade 189.

As stated above, the rocking of the bracket 130 to its inactive position also effects translation of the slide 382 to the right (FIG. 16) and a counter-clockwise rocking of the lever 373 to move the lower end surface of arm 371 sufficiently above the top surface of the projection 368 to enable insertion of a new tape. For this purpose, a flange 405 (FIGS. 7 and 16) is formed upwardly at a right angle to slide 382 intermediate the ends thereof. In the normal operating condition of the parts, the vertically disposed left-hand end of the flange 405 is displaced to the right of a pin 406 on the lower end of the depending portion 147 of leg 128 of U-shaped bracket 130 (FIG. 7). However, upon release of the lever 373 and the penetration of the plunger arm 371 into the aperture 370 (FIG. 16), slide 382 is moved to the left to engage the left-hand end of the flange 405 with pin 406. Consequently, as the bracket 130 is subsequently moved to its locked inactive position, slide 382 is moved to the right beyond its normal operating position, thereby moving the lower end of the plunger arm 371 well above the upper surface of the projection 368 to facilitate the threading of a new tape T.

It will be recalled that upon removal of the nose 202 of arm 201 from active engagement with the aligned notches in disks 172 and 173, cutter rod 186 is angularly rotated to also remove the ear 290 (FIG. 4) from its engagement with the actively positioned one of the notches 291 in disk 292. Thus, upon release of each of these locking means, tape feed roller 126 may be freely rotated. However, means are provided for preventing inadvertent rotation of tape feed roller 126 while bracket 130 is in its inactive position, thereby ensuring retention of the corresponding aligned notches in the disks 172 and 173 and the corresponding notch 291 in disk 292 in position for re-engagement by the nose of arm 201 and the ear 290 of arm 289, respectively. In order to lock roller 126 against rotation at this time, a pair of diametrically opposed concave indentations 407 and 408 are provided in the peripheral edge of the disk 139 secured on one end of the roller 126. Following each 180° rotation of feed roller 126 or after each complete revolution thereof, either indentation 407 or 408 will be in position to receive the arcuate edge of a projection 409 on the depending portion 147 of leg 128 upon rocking movement of the U-shaped bracket 130 to its inactive position, as seen in FIG. 15.

During the installation of a new roll of tape, the roll is first place upon the spindle 114 and the tape is then led, or threaded, around spindle 116 and the angularly disposed peg 118, thence over the top surface of the angular projection 368 beneath the lower end of the plunger arm 371. From this point, the tape is passed beneath, and in contact with, roller 124 on shaft 125 and is thereafter moved laterally, or edgewise, into position between cutting blade 189 and support plate 193 and in contact with the surface of the tape feed roller 126. In threading the tape T, as described, it is desirable that the end portion of the tape extend across and beyond the flat surface 188 of the cutter portion 187. Following the tape-threading operation, the U-shaped bracket 130 is released, moving the roller 127 into its active position relative to feed roller 126, wherein the tape is maintained in frictional contact with the surface of each roller 126 and 127.

To effect restoration of the bracket 130 to its active position, bellcrank 399 is rocked to remove the notch therein from its engagement with pin 397, thereby releasing the bracket 130 to the influence of the spring 144. Manipulation of the bellcrank 399 is facilitated by the provision of a flange 415 which is formed at a right angle to the arm 398 of the bellcrank 399 and is disposed in a horizontal plane. As the roller 127 moves into position relative to roller 126, meshing engagement of the gears 135 and 134 (FIG. 14), carried by the respective rollers 127 and 126, is assured by the operation of a detent lever 416 pivotally mounted at 417 on the inner surface of the leg 129 of bracket 130. The V-shaped nose of an upwardly extending arm of lever 416 is normally urged in a counter-clockwise direction (FIG. 14) by a spring 418 for engagement between adjacent teeth of the gear 135. However, in the active position of the bracket 130, the rounded end portion of an angularly disposed arm 419 of the lever 416 is in engagement with the peripheral surface of a narrow hub integrally formed on gear 134, maintaining the V-shaped nose of the lever 416 out of active engagement with teeth of the gear 135. As the bracket 130 is moved to the inactive position thereof shown in FIG. 15 and as the nose of the arm 419 is moved out of engagement with the hub of the gear 134, spring 418 becomes effective to urge the V-shaped nose of the detent lever 416 into position between adjacent teeth of the gear 135, thereby preventing rotation of the gear 135 during the insertion of a new tape.

Immediately upon restoration of the U-shaped bracket 130 to the active position shown in FIG. 7, the nose of the arm 201 is re-engaged in the aligned notches of the disks 172 and 173, under the urgency of spring 203 (FIG. 18), and the cutter rod 186 is, therefore, rocked to shear the portion of the tape extending beyond the cutter blade 189. Thus, upon initiation of a subsequent tape feeding operation, a strip of tape of proper length will be advanced to the printing station. It is also apparent that upon restoration of bracket 130, spring 376 becomes effective to rock lever 373 clockwise (FIG. 7), thereby imparting a slight leftward movement to the slide 382 sufficient to restore the slide to its normally operative position, as determined by the engagement of the lower end of plunger arm 371 with the surface of the tape T.

Normally, as stated hereinbefore, spring 389 (FIG. 7) serves to resiliently retain the slide 382 in its operative position, wherein the rightmost end of the slide is over the aperture 386 in base plate 80. However, if the tape T is improperly inserted in the passage between the supporting plate 193 and cutter blade 189 (FIG. 8) so that the tape does not cover an aperture 414 in plate 193, the subsequent rotation of feed roller 126, under the control of actuator rack 156, will be insufficient to advance the leading end of the tape into frictional engagement with the feed belt 21. If such be the case, means are provided which, upon restoration of bracket 130 to its active position, will be effective to immediately return the slide 382 to its inoperative position (FIG. 16), i.e., the position to which the slide is moved following depletion of the tape supply. For this purpose, a sensing lever 424 (FIGS. 7, 16 and 19) is positioned adjacent frame member 111 and is rockably mounted, intermediate its ends, on a pin 425 secured on frame member 111. Lever 424 is normally urged clockwise by means of a relatively strong spring 426 supported at its one end on a pin carried by lever 424 and at its other end on pin 400 on frame member 111. The spring 426 normally serves to maintain the lower end of lever 424 in engagement with a pin 427 projecting laterally from flange 405 on slide 382 through a suitable elongated slot 428 in frame member 111. At its upper end, lever 424 is provided with a lateral projection 429 extending midway axially of roller 127 in spaced parallel relationship thereto and having its end portion formed angularly downwardly from the upper edge thereof to provide a finger 430 (FIG. 8). Finger 430 is spaced from, and is parallel to, the surface of the projection 429 and extends downwardly through aligned similar apertures 431 in the web portion of the channel member 191, in guide member 192 and in cutting blade 189. At its lower end, finger 430 is provided with a lip 432 projecting outwardly in the direction of travel of tape T and angularly upwardly from the plane of travel of the tape. Normally, lever 424 is in the position shown in FIG. 7, wherein the rounded surface formed by the angularly upwardly extended lip 432 (FIG. 8) is in contact with the top surface of the tape in a position directly above an aperture 414 in supporting plate 193.

If, for any reason, the tape T does not cover aperture 414 sufficiently to prevent passage of the lip 432 of finger 430 through aperture 414, spring 426 overcomes the influence of spring 389 and rocks lever 424 in a clockwise direction to the position shown in FIG. 16, moving slide 382 to the left to its inactive position. If this condition should occur, U-shaped bracket 130 is rocked to its inactive position and the movement of slide 382 to the right, as viewed in FIG. 7, serves, by means of pin 427, to rock lever 424 counter-clockwise, thereby moving the lip 432 of the finger 430 to a position above cutter blade 190. Following the proper insertion of the new tape T and the return of the bracket 130 and, therefore, slide 382 to the active position thereof, the base plate 80 and mechanism mounted thereon is replaced in the machine and is raised and locked in its active position by manipulation of handle 90. Referring now to FIG. 3, as the base plate 80 is raised into its operative position, the right end portion of the slide 382 engages the lateral projection 387 of lever 346, rocking lever 346 clockwise, thereby enabling the return of the link 339 to its active position relative to ear 337 on rocker plate 326.

As explained hereinbefore, feed belt 21 is adaptable to advance envelope as well as tape through the metering device to receive postage impressions thereon. For this reason, the surface of the belt 21 is divided into two parts, a wide portion 437 and a narrower portion 438, separated by a groove 436 extending the full length of the belt parallel to the edges thereof. When it is desirable to employ the metering device for the purpose of printing postage impressions upon envelopes or other mail matter, both portions 437 and 438 of feed belt 21 serve jointly to advance the envelope to, and beyond, the printing station. However, when it is desirable to use strips of gummed tape for application on mail matter of various types, the tape is advanced into frictional engagement with the wide portion 437 of the belt 21 by the operation of the tape feed roller 126. Following its engagement with belt 21, the tape is subsequently cut to form a strip of a desired length and the strip is thereafter advanced into position by the wide surface 437 of the belt for a postage impression by each of the printing drums 27 and 28, from whence the gummed tape is dispensed either in a moistened or non-moistened state, as desired. The moistened or non-moistened state of the dispensed strip of gummed tape is selectively controlled by the respective depression of key 151 or key 150 (FIGS. 2, 23 and 27), each of which keys serves to initiate an operation of the tape feed roller 126, as described above, and to also control the positioning of a deflector plate 439 relative to the feed belt 21.

Referring now to FIGS. 2, 3, 23, 24 and 25, deflector plate 439 is adjustable to either of two positions relative to the top surface of the feed belt 21. At its respective ends, plate 439 is provided with parallel arms 440 and 441, each arm having an aperture therein axially aligned, one with the other, to rockably support plate 439 on a shaft 442 suitably supported in similar lobes 443 of parallel flanges 444 and 445 of a channel bracket 446. Bracket 446 is mounted within the framework of the machine by means of a cover plate 447 which is secured on the web portion of the bracket 446 by any suitable means, such as screws 448, and is also secured to frame members 13 and 14 by means of screws 449. When secured in place within the framework of the machine, the top surface of the cover plate 447 is flush with the top surface of the cover 16. The adjustment of the deflector plate 439 relative to the feed belt 21 is such that, in one position of the plate 439, each strip of printed gummed tape will be advanced across the top surface of the plate 447 in a non-moistened state, while in the other position of the plate, each gummed tape strip will be directed through a moistening device, generally indicated at 450, and will thereafter be dispensed through a suitable opening 451 in the end of the cover 16.

Normally, deflector plate 439 is urged by a spring 455 in a counter-clockwise direction (FIGS. 24 and 25) to a position wherein laterally inwardly projecting ears 456 and 457, carried by an extension of the respective arms 440 and 441 of deflector plate 439, rest against the upper edge of respective side members 48 and 47 of the conveyor cradle 49, as seen in FIG. 2. When the ears 456 and 457 are in engagement with the side members 48 and 47, respectively, a pair of tines 458 and 459, extending outwardly from the leading edge of the plate 439, are positioned below the running surface of the belt 21, tine 458 assuming a position adjacent the edge of the belt and tine 459 engaging in the groove 436 in the belt. Also, the leading edge of plate 439 between tines 458 and 459 is V-shaped and lies adjacent the wide portion 437 of the belt 21 slightly below the horizontal running surface of the belt. Likewise, the leading edge of the portion of the plate 439 below the tine 459 (FIG. 2) lies adjacent the portion 438 of belt 21 and slightly below the horizontal running surface thereof. Thus, the V-shaped edge portion of the deflector plate 439 causes each strip of tape to be advanced by the portion 437 of belt 21 over cover plate 447 for dispensation in a non-moistened state. Similarly, the tines 458 and 459 serve to direct envelopes, or other mail matter being conveyed by the belt 21, over the top surface of the deflector plate 439 and cover plate 447.

When it becomes desirable to dispense strips of gummed tape in a moistened state and, if the deflector plate 439 is in the normal spring-urged position described above, a depression of control key 151 becomes effective to cause the deflector plate 439 to be rocked clockwise to the position shown in FIGS. 3, 23, 24 and 25. In the normal position of the deflector plate 439, the upper edge surface 460 of the V-shaped end of a rightward extension 461 of arm 440 lies in the horizontal plane of travel of a pin 462 which is carried by the key stem 352 of the key 151 and projects through an elongated slot 463 in frame member 14 (FIGS. 3, 23 and 24). Thus, as key 151 is moved to the left in FIG. 3, pin 462 engages the surface 460, imparting a clockwise rocking movement to the deflector plate 439. As the plate 439 is rocked clockwise into the position shown in FIG. 24, a shoulder formed in the arcurate edge of a distended portion of the arm 440 engages an ear 468 projecting laterally from the upper end of a vertically disposed arm 469 secured on a shaft 470 intermediate frame members 13 and 14. Shaft 470 is suitably journalled in frame members 13 and 14 and, at its respective ends, carries a bellcrank 471 and an upstanding arm 472 secured thereon exteriorly of the respective frame members 13 and 14 (FIGS. 3, 23 and 27). A spring 473, having its upper end engaged in an aperture in one arm of the bellcrank 471 and its lower end secured on a pin on frame member 13, serves to resiliently urge the ear 468 of arm 469 into engagement with the shoulder formed in the arcuate edge of the arm 440. Thus, it can be seen that with the deflector plate 439 in its latched condition, each strip of tape is directed downwardly over the moistening device 450 to be dispensed in a moistened state, as will be later described.

Following an operation of the device, wherein the deflector plate 439 has been latched in position to direct a tape strip over the moistening device 450, a depression of the key 150 or the advancement of an envelope by feed belt 21 will effect a release of the latch and enable plate 439 to return to its normal position under the urgency of spring 455. At its upper end, the vertically disposed arm of bellcrank 471 (FIG. 27) is provided with a rounded nose 474 adapted for engagement by an ear 475 formed outwardly at a right angle to the key stem 353 of the key 150. It is, therefore, apparent that, as key 150 is depressed to initiate operation of the tape feed roller 126 to provide a non-moistened strip of tape, the ear 475 on key stem 353 engages the nose 474, rocking bellcrank 471 and, therefore, shaft 470 in a clockwise direction. As shaft 470 is rocked clockwise (FIG. 27) or counter-clockwise (FIG. 24), the ear 468 of arm 469 is moved out of engagement with the shoulder in arm 440 and the deflector plate 439 is released to the influence of its spring 455. Inasmuch as very little movement of the latch arm 469 is required to release deflector plate 439, a lost motion is provided in the movement of the key stem 353 to the right prior to the engagement of the ear 475 thereon with nose 474 of the bellcrank 471.

As stated above, the release of the deflector plate 439 from its latched to its normal position may also be effected upon the advancement of envelopes or other mail matter through the printing station by means of feed belt 21. For this purpose, a bellcrank 480 (FIGS 3 and 4) is pivotally mounted on a pin 481 secured on frame member 14. At its lower end, one arm of bellcrank 480 carries a pin 482 pivotally supporting one end of a link 483, the other end of which is provided with a slot 484 engaged by a pin 485 on the upper end of the arm 472 secured on shaft 470. Arm 486 of bellcrank 480 extends angularly upwardly and is formed-over at its end providing an arcuate surface which is normally urged by spring 473 to a position above the running surface of feed belt 21 and in engagement with a node 487 formed on the lower edge of the cover of the meter unit 20. Thus, it can be seen that, as an envelope passes between the node 487 and the end portion of the arm 486 of bellcrank, bellcrank 480 is rocked clockwise (FIG. 3), moving link 483 to the left, thereby rocking arm 472 and shaft 470 counterclockwise to release latch arm 469 from its active engagement with the shoulder on arm 440 of the deflector plate 439.

Upon depression of key 151 and the rocking and latching of the deflector plate 439 in the position shown in FIGS. 24 and 25, the advancement of each strip of tape by feed belt 21 moves the leading end of the tape strip into contact with a baffle plate 490 formed angularly downwardly and welded or otherwise secured in any suitable manner to the underside or deflector plate 439. The lower end of a fringer, or tine, 491 extending downwardly from plate 490 is maintained in contact with the surface of the cylindrical portion of a spool 492 which is revolvable about a reduced diametral portion of shaft 442. The tine 491 is positioned intermediate the end rims 493 and 494 of the spool 492, each of the rims 493 and 494 being substantially V-shaped in cross-section and having the ridge formed thereby in contact with the surface of the wider portion 437 of feed belt 21. Spool 492 is extended at each end beyond the respective V-shaped rims 493 and 494, with one end surface abutting the inner surface of flange 445 and the other end surface abutting the shoulder formed on the shaft 442 to prevent axial movement of the spool.

Normally, the tape strip will adhere to the surface of the belt 21 as it runs over the pulley 44, immediately following the passage of the strip between the belt 21 and pressure roller 60 (FIG. 4). However, if the leading end of the tape strip tends to become detached from the belt 21, it will move outwardly into contact with plate 490. Finger 491 on plate 490 will then direct the strip into frictional contact with the belt to continue the advancement of the strip between the belt and the ridges of the respective rims 493 and 494 of the revolving spool 492. Thereafter, the tape strip is separated, or peeled, from the belt 21 by the engagement thereof with the chamfered end of each of similarly arcuately formed tines 495 of a forked bracket 496 carried by the moistening device 450, as will be later described. One of the tines 495 of bracket 496 is positioned, as seen in FIG. 24, within the groove 436 of the belt 21, while the other of the tines 495 is positioned adjacent the outer edge of the wide portion 437 of the belt 21 below the running surface thereof. As each strip of tape is separated from the feed belt 21, the strip is moved to the right (FIG. 25) through a passageway formed between bracket 496 and a substantially horizontally extended flange 497 of a channel bracket 498 secured to the undersurface of the web portion of the bracket 446 between the flanges 444 and 445. In its travel through the passageway formed by the bracket 496 and the flange 497, the leading end of the tape strip engages the right-hand wall of an inverted V-shaped channel 499 formed in the lower surface of the flange 497 transversely of the path of travel of the tape strip. Upon engaging the right-hand wall of the channel 499, the tape strip is directed downwardly across, and in contact with, the moistening surface of the moistening device 450.

Referring now to FIGS. 23, 25, 26 and 28, the moistening device 450 comprises an L-shaped blade 502 and an L-shaped block, or reservoir, 503 having a rectangular cavity 504 formed therein and extending substantially the length of the longer leg of the block 503. Block 203 and blade 502 are secured together by a plurality of screws 505 which pass through suitable clearance holes in the bottom portion of the block 503 and are threaded into the plate 502, the screws 505 also serving to support bracket 496 on block 503. The contact surfaces of the block 503 and plate 502 are smooth so that, upon tightly securing block 503 to the plate 502, the reservoir is sufficiently sealed against loss of liquid by way of the joined surfaces. Along its right-hand edge, the lower inner surface of the upper wall portion of block 503 is chamfered, as at 506, to provide a narrow lip 507. Lip 507 forms the bottom surface of a recess extending the length of the upper wall portion of block 503 in the right-hand edge thereof. The depth of the recess is such that, upon securing the block 503 to the plate 502, a restricted slot 512 of a predetermined width of approximately .010 of an inch is formed between the lip 507 and the inner surface of plate 502. The slot 512 is sealed at its ends by the respective end walls of the longer leg of the L-shaped block 503.

Referring to FIGS. 26 and 28, liquid, under pressure, enters the reservoir formed by the cavity 504 which has a metered opening, at its one end, into the lower end of a liquid level chamber 508 formed in the vertically disposed shorter leg of the L-shaped block 503. In order to seal the chamber 508 against a loss of liquid by leakage, the upper end portion of the shorter leg of the L-shaped plate 502 is secured in close contact with the block 503 by means of a screw 511. A vertically disposed wall 509, defining a portion of the chamber 508, serves to separate the chamber 508 from a discharge port 510 having its opening in the bottom of the block 503. The top edge of the wall 509 is slightly below the outer opening of the restricted slot 512 defined by the lip 507, the inner surface of the upper portion of the moistener blade 502 and the end walls of block 503. As liquid is forced into the reservoir, or cavity, 504 under pressure, an equalization of the pressure and the formation and maintenance of a convex meniscus along the outer opening of the restricted slot 512 is determined by the position of the top edge of the wall 509 relative to the slot opening. Thus, the convex meniscus formed by the liquid, under pressure, serves to moisten the gummed surface of each tape strip as it is advanced through the passageway formed by the plate 496 and flange 497 and, upon contact with the wall of the V-shaped channel 499, is directed downwardly across the outer opening of the restricted slot 512.

The moistening device 450 is secured in position between the flanges 444 and 445 of the channel bracket 446 in a manner such that the moistening surface of the restricted slot 512 is positioned in a plane parallel to, and adjacent, the right-hand surface of the V-shaped channel 499 in guide flange 497 (FIG. 25). At each end thereof, blade 502 is provided with similar extended ears 514 (FIG. 24) positioned in corresponding notches in the lower extended end of each flange 444 and 445 of the bracket 446. Similarly, each end of the web portion of a channel brace 515 (FIGS. 23, 24 and 25) is extended to provide similar ears 516, also positioned in corresponding notches in the lower extension of the flanges 444 and 445 in opposition to the notches therein, supporting blade 502. The ears 514 of the blade 502 and the ears 516 of the channel brace 515 are secured in position in the corresponding notches by means of screws 517, which screws 517 are passed through suitable clearance holes in the web portion of the channel brace 515, similar holes in plate 502 and into threaded apertures in the lower portion of the block 503. Screws 517 also serve to secure one leg of an angle bracket 518 to the outer surface of the web portion of the channel brace 515.

As the tape strip passes over the moistening surface of the slot 512 (FIG. 25), it is directed downwardly into engagement with the surface of the upper flange of the channel brace 515 and continues to advance across the top surface of each of similar laterally extended fingers 519 carried by bracket 518, the fingers 519 serving to direct the tape through the opening 451 in cover plate 16. The distance the tape strip travels from the point of its separation from feed belt 21 to the right, and exteriorly of the cover 16, is less than the length of the "short" tape, so that the advancement of the tape strip by the feed belt 21 continues until a sufficient portion of the tape extends beyond the cover 16 to be grasped by the fingers of an operator for removal from the moistening device.

As the strips of tape are advanced across the slot opening 512 in the moistening device 450, some liquid will tend to flow down the outer surface of the plate 502 into a drip tray 522 secured on the bottom surface of the reservoir 503. The tray 522, which is preferably of a plastic material, has a pair of similar bosses 523 (FIGS. 24 and 25) integrally formed on the inner bottom surface of the tray. In order to secure the tray 522 to the bottom of the reservoir 503, a clearance hole is provided in each of the bosses 523, and a screw 524, passing through the hole in one of the bosses 523, is threaded into a hole 525 (FIG. 26) in the reservoir 503. Through the clearance hole in the other of the bosses 523, the threaded end of a tube connector 526 is passed for engagement in a threaded aperture 527 in the reservoir 503. Intermediate its ends, the tube connector 526 is provided with a hexagonal fitting which serves, together with screw 524 and upon the threaded engagement of the tube connector in the aperture 527, to secure the tray 522 in place.

Liquid is supplied to the reservoir 503 from a liquid supply tank 530 (FIGS. 2 and 4) which is removably mounted on the base 11 of the base portion 10 of the machine by suitable clips 531 and is readily accessible for service through a drop door 532 (FIG. 1) in the cover 16. To supply liquid from the tank 530 into the cavity 504 of the reservoir 503, a hose 533 is connected at its one end on the lower extended end of tube connector 526 (FIGS. 23 and 25) and, at its other end, to a valve fitting 529 extending downwardly through the cover of the tank 530 to the outlet side of a suitable pump of a conventional type submerged in the liquid supply. The pump is continuously driven from drive shaft 54 (FIGS. 2 and 4) by means of a belt 534 passing over a pulley 535 secured on shaft 54 and a pulley 536 secured on pump shaft 537. Within the valve fitting 529 is a ball check which becomes effective upon termination of the operation of the pump to prevent the return of the liquid in the reservoir 503 to the tank 530.

Liquid, which may be caused to flow down the surface of the blade 502 during the passage of tape across the slot opening 512 in the moistening device 450, is collected in the drip tray 522, from whence it is returned by gravity flow into the supply tank 530. Also, the metered flow of liquid, in passing through the reservoir 503 during operation of the pump, is discharged through the port 510 into drip tray 522 and is likewise returned to the supply tank 530. For this purpose, an aperture 540 (FIGS. 23 and 24) is provided in the bottom portion of the drip tray 522 adjacent its left-hand end and is positioned above, and in proximity to, an open receptacle 541 suitably secured by means of a screw 542 on frame member 14. A tube extension of receptacle 541 projects outwardly through a suitable aperture in frame member 14, providing a connection for one end of a hose 543 with the receptacle 541. The other end of the hose 543 extends downwardly through an opening in the cover of the tank 530, thereby completing a return for the liquid collecting in the drip tray 522 back to the source of supply. Thus, it becomes apparent that the liquid is constantly re-circulated during the operation of the pump until such time as it is deemed desirable to clean the tank 530 and refill it with fresh liquid.

We claim:

1. In an indicia printing machine having a printing station, means for conveying matter to be printed past the printing station, power-driven means for controlling continuous operation of said conveying means, and a detachable tape feed mechanism for controlling the advancement and the selective cutting of the tape into each of a plurality of different strip lengths for movement by said conveying means past the printing station, the combination comprising a base member adapted to be attached to the machine, a framework mounted on said base member, a feed roller supported in said framework operable to effect advancement of the tape into frictional engagement with said conveying means, a cutter interposed between said feed roller and said conveying means operable to sever the tape forming a strip to be advanced by said conveying means past the printing station, means selectively settable to control the operation of said cutter for predetermining the length of a severed strip, and means for operating said cutter enabled by said conveying means subsequent to the engagement of the tape therewith and in accordance with the setting of said settable means.

2. In an indicia printing machine having printing devices and means for directing separate pieces of matter to be printed to said printing devices, power-driven means for effecting continuous operation of said directing means, and a tape control mechanism for advancing tape to said directing means and for severing the tape forming a strip of a selected one of a plurality of lengths to be directed by said directing means to the printing devices, the combination comprising a base member adapted to be removably attached to the machine, a source of tape supply mounted on said base, a framework mounted on said base, a shaft supported in said framework, driving means for imparting rotation to said shaft, a roller carried by said shaft operable upon operation of said driving means to advance the tape a given distance into contact with said directing means, said directing means becoming effective thereafter to continue movement of the tape and selective incremental rotation of said roller, means for cutting the tape into strips to be directed to said printing devices by said directing means, means for terminating rotation of said roller and for operating said cutting means rendered operable by said directing means and the advancement of the tape thereby subsequent to the operation of said driving means, and means adjustable to control the operation of said terminating means for selected increments of rotation of said roller whereby strips of tape of selected lengths are severed by said cutting means.

3. In an indicia printing machine having printing devices, means for directing separate pieces of matter to said printing devices to be printed, power-driven means for effecting continuous operation of said directing means, and a tape feed mechanism, the combination comprising a source of tape supply, normally inactive means for feeding the tape from said source of supply, locking means for resiliently maintaining said feeding means in one of a plurality of inactive positions, means actuated by said power-driven means to release said locking means and to control operation of said feeding means to move the tape a given distance into engagement with said directing means, said directing means being operative to continue the advancement of the tape and to effect a return of the feeding means to a selected one of its inactive positions subsequent to the operation of said actuated means, selectively settable means for controlling re-engagement of said locking means with said feeding means in a predetermined inactive position thereof thereby determining the extent of advancement of the tape by said directing means, and means for cutting the tape to form a strip of a predetermined length rendered operable by said locking means during the continued advancement of the tape by said directing means and in accordance with the setting of said settable means.

4. In an indicia printing machine having printing devices, means for directing separate pieces of matter to be printed to said printing devices, power-driven means for effecting continuous operation of said directing means, and a tape feed mechanism, the combination comprising means rotatable for a partial revolution to advance the tape into engagement with said directing means and selectively thereafter for at least one of a plurality of increments of a revolution upon continued advancement of the tape by said directing means, means actuated by said power-driven means operable to control the partial revolution of said rotatable means, a cutter means interposed between said rotatable means and said directing means operable to sever the tape thereby forming a strip to be directed by said directing means to the printing devices, means adjustable selectively to enable operation of said cutter means for severance of a strip of a selected length, and means operable to terminate the rotation of said rotatable means and to operate said cutter means subsequent to predetermined increments of a revolution of said rotatable means in accordance with the adjustment of said adjustable means.

5. In an indicia printing machine having rotary printing devices, printing dies on said rotary printing devices, certain of said printing dies being adjustable from a non-print to a print position, means selectively settable to control the adjustment of said certain of said printing dies, means for conveying separate pieces of matter to be printed to said printing devices, power means for effecting continuous operation of said conveying means and operation of said rotary printing devices in timed relation to the speed of said conveying means, and a tape feed mechanism, the combination comprising means for advancing the tape a given distance into engagement with said conveying means thereby enabling said conveying means to continue the advancement of the tape, a cutter device for severing the tape forming a strip of a predetermined length to be printed by said rotary printing devices, actuating means operable to effect an intermittent operation of said advancing means to move the tape into engagement with said conveying means, power-driven means operable to terminate operation of said advancing means and to control the operation of said cutter device during the continued conveyance of the tape by said conveying means, and means rendered operable by said settable means to control the operation of said power-driven means in accordance with the setting of said settable means.

6. In an indicia printing machine having a pair of rotary printing devices, printing dies on each of said rotary printing devices, a certain of said dies on one of said printing devices being adjustable to a non-print or print position, means selectively settable to control the adjustment of said certain of said dies, means for conveying separate pieces of matter to be printed to said printing devices, a power means, means driven by said power means for controlling continuous operation of said conveying means, cyclically operable means driven by said power means for controlling operation of said printing devices in timed relation to the speed of said conveying means, and a tape feed mechanism, the combination comprising a feed roller for the tape rotatable for either of two angular increments of rotation, a cutter interposed between said feed roller and said conveying means in the path of advancement of the tape, an intermittently operable actuating means for imparting a partial increment of rotation to said feed roller to effect engagement of the tape with said conveying means for advancement of the tape thereafter by said conveying means, a power-operated means operable to selectively terminate the rotation of said feed roller following either angular increment of rotation thereof subsequent to the operation of said actuating means and to simultaneously control the operation of said cutter to sever the tape thereby forming a strip of a predetermined length during the advancement of the tape by said conveying means, and means positionable by said settable means to control operation of said power-operated means to terminate rotation of said feed roller and to actuate said cutter in accordance with the adjustment of said certain of said dies to print or non-print position.

7. In a letter and tape printing device having a printing station including a rotary printing means, a feed belt for advancing matter to be printed past the printing station for an impression by said rotary printing means, means for continuously driving said feed belt, means driven by said driving means selectively operable to control cyclic operation of said rotary printing means in timed relation to the surface speed of said feed belt, a detachable tape feed mechanism for controlling the feeding of the tape and the cutting of the tape into strips for advancement by said feed belt past the printing station, the combination comprising a base plate adapted to be attached to the device adjacent said feed belt, a framework secured on said base plate having a shaft journalled therein, a feed roller secured on said shaft engaging one surface of the tape, a gear secured on said feed roller concentric therewith, an auxiliary feed roller supported in said framework engaging the other surface of the tape, a pinion connected to said auxiliary roller enmeshed with said gear to thereby effect a rotation of said auxiliary roller upon rotation of said feed roller and in a direction opposed to the direction of rotation of said feed roller to control the advancement of the tape therebetween, a first disk secured on said shaft having a pair of diametrically opposed notches in the periphery thereof operable to predetermine the angular rotation of said feed roller, a second disk rotatably mounted on said shaft having a pair of diametrically opposed notches in the periphery thereof normally axially aligned with the corresponding notches in said first disk, said second disk being positioned adjacent said first disk and having a lost motion driving connection therewith, a rockable cutter interposed between said feed roller and said feed belt in the path of travel of the tape operable to sever the tape forming a strip of a length determined by the angular rotation of said feed roller, a detent means normally engaged selectively in either of the notches in said first disk and the corresponding aligned notch in said second disk to prevent rotation of each of said disks and said feed roller and operable upon engagement in the aligned notches in said first and said second disk to control operation of said cutter, a driving pinion freely rotatable in one direction on said shaft, a coil spring clutch interposed between said driving pinion and said second disk operable upon rotation of said driving pinion in the other direction to cause an increment of angular rotation of said second disk, the initial portion of the angular increment of rotation of said second disk being operable to effect disengagement of said detent means rocking said cutter to an inactive position and to thereafter cause rotation of said first disk and said feed roller to advance the tape into frictional engagement with said feed belt, a normally inactive rack enmeshed with said driving pinion operable upon movement to an active position to effect the increment of angular rotation of said driving pinion in said other direction, said feed belt becoming effective upon engagement of the tape therewith to continue the advancement of the tape and the rotation of said feed roller and each of said disks until a selective one of the notches in said first disks and the corresponding notch in said second disk are moved into position for engagement by said detent means, power means for effecting engagement of said detent means and the operation of said cutter, resilient means for restoring said rack to the inactive position subsequent to the angular increment of rotation of said driving pinion, means controlled by said rack for initiating operation of said driven means upon movement of said rack to active position, an actuator means driven intermittently by said driving means to move said rack to the active position and to thereafter enable operation of said resilient means, and manually settable means for controlling the operation of said power means.

8. In a tape feed device, the combination of a source of tape supply, a feed roller rotatable to advance the tape from the source of supply, means associated with said feed roller operable to limit the rotation of said feed roller to a selected one of a plurality of angularly rotated positions thereof, means selectively settable to represent each angularly rotatable position of said feed roller, an intermittently operable actuator means for effecting an incremental rotation of said feed roller to advance the tape a given distance, a continuously running conveyor means operable to be engaged by the tape upon operation of said actuator means and to thereafter continue the advancement of the tape and the rotation of said feed roller, means for cutting the tape to form a strip of a length determined by the angular rotation of said feed roller, and means for controlling operation of said cutting means enabled by said associated means in accordance with the adjustment of said settable means.

9. In a tape feed device, the combination of a source of tape supply, a feed roller rotatable to advance the tape from the source of supply, a disk associated with said feed roller for rotation therewith and having a plurality of equally spaced notches in the periphery thereof, means for causing rotation of said disk and said feed roller to effect advancement of the tape, a cutting means for severing the tape to form a strip of a selected length, means engageable selectively in one of the plurality of notches in said disk operable to terminate the rotation of said feed roller and to control operation of said cutting means, adjustable means for controlling operation of said engageable means; and means for effecting operation of said engageable means in accordance with the adjustment of said adjustable means.

10. In a tape feed device, the combination of a source of tape supply, a rotatable means for advancing the tape from the source of supply, means for controlling incremental rotation of said rotatable means, means for cutting the advanced portion of the tape to form strips of tape of predetermined lengths in accordance with the incremental rotation of said rotatable means, power-operated means normally operable to terminate operation of said controlling means and to control operation of said cutting means following each incremental rotation of said rotatable means, means adjustable to selectively control the operation of said power-operated means to enable operation of said controlling means for a plurality of increments of rotation of said rotatable means, and a manipulative means for adjusting said adjustable means.

11. In a tape feed device, a tape supply source, a shaft, a feed roller mounted on said shaft and engaging one surface of the tape, a continuously operable auxiliary feed means for discharging selected lengths of tape strips, a disk means mounted on said shaft for rotation with said feed roller and having a plurality of notches in the periphery thereof, each notch representative of an angularly rotated position of said feed roller, an actuating means for effecting an incremental rotation of said disk means and said feed roller to advance the leading end of the tape a given distance into engagement with said auxiliary feed means, said auxiliary feed means being operable thereafter to pull the tape causing continued rotation of said feed roller, a cutter operable to sever the advanced portion of the tape forming tape strips of predetermined lengths in accordance with the angularly rotated position of said feed roller, means engageable in a selective one of the notches in said disk means to terminate rotation of said feed roller and effect operation of said cutter, means adjustable to control operation of said engageable means, and a manually controlled means for adjusting said adjustable means.

12. In a tape feed device, a tape supply source, a shaft, a feed roller mounted on said shaft and engaging one surface of the tape, a continuously operable auxiliary feed means for discharging selected lengths of tape strips, a disk means mounted on said shaft for rotation with said feed roller and having a pair of diametrically opposed notches in the periphery thereof, each notch representative of an angularly rotated position of said feed roller, an actuating means for effecting an incremental rotation of said disk means and said feed roller to advance the leading end of the tape a given distance into engagement with said auxiliary feed means, said auxiliary feed means being operable thereafter to continue the advancement of the tape thereby continuing rotation of said disk means and said feed roller, means for disabling said actuating means subsequent to the incremental rotation of said disk means and said feed roller, a cutter for severing the advanced portion of the tape to form tape strips of predetermined lengths in accordance with the angular rotation of said feed roller, means selectively engageable in one notch or the other notch in said disk means to terminate rotation of said feed roller in either of two angularly rotated positions thereof and to effect operation of said cutter during the advancement of the tape by said auxiliary feed means, power means for effecting operation of said engageable means, means for enabling operation of said power means, a manually settable means, and means adjustable by said manually settable means to control operation of said enabling means.

13. In a tape feed device, a tape supply source, a shaft, a feed roller mounted on said shaft and engaging one surface of the tape, an auxiliary feed means for discharging selected lengths of tape strips, a continuously operable drive means for driving said auxiliary feed means, a disk means mounted on said shaft and having a plurality of notches in the periphery thereof for controlling angular rotation of said feed roller, a unidirectional driving means intermittently operable to effect an increment of angular rotation of said feed roller to advance the leading end of the tape a given distance into engagement with said auxiliary feed means, said auxiliary feed means being operable thereafter to continue the advancement of the tape causing continued rotation of said feed roller, means engageable in a selective one of the plurality of notches in said disk means to terminate rotation of said feed roller, power means for controlling operation of said engageable means, a manually settable means, means adjustable by said manually settable means to control the selective operation of said engageable means by said power means, a cutter rendered operable by said engageable means upon termination of the rotation of said feed roller to sever the advanced portion of the tape forming tape strips of predetermined lengths in accordance with the angularly rotated position of said feed roller, and a control means for initiating an intermittent operation of said unidirectional driving means.

14. In the apparatus of claim 13, said unidirectional driving means comprising a pinion rotatably mounted on said shaft, a unidirectional clutch connecting said pinion to said shaft operable upon rotation of said pinion in one direction to effect an increment of rotation of said feed roller, means engaging said pinion and movable from a normally inactive position to an active position thereby enabling operation of said clutch, means for restoring said engaging means to its inactive position, an actuator means intermittently operable to effect movement of said engaging means to its active position and to thereafter enable operation of said restoring means, and a control key operable upon manipulation thereof to initiate operation of said actuator means.

15. In the apparatus of claim 14, said actuator means comprising a gear driven by said continuously operable drive means, a normally inactively positioned rack engageable with said gear to impart movement to said engaging means, means rockable by said control key from an inoperative to an operative position to effect engagement of said rack with said gear, means operable to resiliently maintain said rockable means in either position thereof, spring means for urging said rack to its inactive position, and means associated with said rack operable upon a predetermined movement of said rack to return said rockable means to its inoperative position subsequent to the engagement of said rack with said gear thereby enabling operation of said maintaining means and said spring means.

16. In a tape feed device, a tape supply source, a feed roller engaging one surface of the tape, a driving means for effecting an angular rotation of said feed roller to advance the tape a given distance, means for sensing the passage of the terminal end of the tape from the tape supply source, a continuously operable drive means, means engageable with said continuously operable drive means to control operation of said driving means, means adjustable to control the engagement and disengagement of said engageable means, resilient means for maintaining said adjustable means in either adjusted position thereof, a control key, means operated by said key for adjusting said adjustable means to effect engagement of said engageable means, means associated with said engageable means operable to adjust said adjustable means to effect disengagement of said engageable means subsequent to manipulation of said control key and a predetermined movement of said engageable means, and means rendered operable by said sensing means to disable operation of said key operated means.

17. In an indicia printing machine, cyclically operable printing devices for printing indicia on envelopes and gummed tape strips, a continuously driven conveyor means operable to selectively convey envelopes and gummed tape strips past said printing devices to receive a printed impression thereon, means for controlling cyclic operation of said printing devices in timed relation to the surface speed of said conveyor means, a source of tape supply, a rotatable means mounted adjacent one end of said conveyor means for cooperation therewith and operable to receive predetermined angular increments of rotation to advance the tape from said source of supply, an actuator means for effecting a partial increment of rotation of said rotatable means to advance the tape a given distance into frictional engagement with said conveyor means, said conveyor means becoming effective thereafter to continue advancement of the tape and rotation of said rotatable means, means for initiating operation of said controlling means rendered operable selectively by an envelope upon engagement with said conveyor means and by said actuator means, a cutter device for cutting the tape to form a strip of a predetermined length for advance by said conveyor means, means for terminating rotation of said rotatable means following selected increments of rotation thereof and for effecting operation of said cutter device, and a manually adjustable means for controlling operation of said terminating means to predetermine the increments of rotation of said rotatable means.

18. In the apparatus of claim 17, a moistening device, a tape deflector positioned in the path of the tape adjacent the discharge end of said conveyor means adjustable to either of two positions, a pair of control keys, means controlled by either of said keys for effecting operation of said actuator means, one of said keys being operable to adjust said tape deflector to one position to cause a gummed tape strip to be discharged by said conveyor means in a non-moistened state and the other of said keys being operable to adjust said tape deflector to the other position to direct a gummed tape strip into operative relation with said moistening device to be discharged by said conveyor means in a moistened state, and means controlled by an envelope during advancement by said conveyor means to effect adjustment of said tape deflector to said one of said positions when in said other of said positions.

19. In an indicia printing machine for envelopes and gummed tape strips, a printing station including cyclically rotatable printing devices, a continuously driven conveyor means for selectively conveying an envelope and gummed tape strip past the printing station for a printed impression by said printing devices and to thereafter discharge the printed gummed tape strip in a moistened or non-moistened state, a source of tape supply, an intermittently operable actuating means, a tape feed means rendered operable by an intermittent operation of said actuating means to advance the gummed tape a given distance into frictional engagement with said conveyor means thereby enabling said conveyor means to continue the advancement of the gummed tape, means selectively controlled by an envelope upon engagement with said conveyor means and by said actuating means to effect cyclic operation of said printing devices, a cutter device for cutting the gummed tape to form a strip during the advancement of the gummed tape toward the said printing station by said conveyor means, a manually adjustable means selectively settable to control the operation of said cutter device to form a tape strip of a selected one of a plurality of predetermined lengths, a pair of control keys, each operable to initiate an intermittent operation of said actuating means, a moistener device, a deflector plate positioned adjacent the discharge end of said conveyor means in the path of the gummed tape strip and adjustable to either of two positions to effect a discharge of gummed tape strip in a moistened or non-moistened state, means controlled by one of said keys to adjust said deflector plate to one of said positions to direct the gummed tape strip into contact wtih said moistener device, means enabled by the other of said keys to adjust said deflector plate to the other of said positions whereby the tape strip is discharged in a non-moistened state, and means controlled by an envelope during the advancement thereof by said conveyor means to effect operation of said enabled means following the adjustment of said deflector plate to said one of said positions.

20. In the apparatus of claim 18, the said moistener device including a moistener blade positioned in the path of travel of the tape, said moistener blade having a liquid reservoir therein and a discharge slot along the upper surface thereof extending transversely of the path of travel of the tape operable to restrict the passage of liquid therethrough, means for supplying an uninterrupted flow of liquid into the reservoir of said moistener blade, guide means for directing a gummed tape strip across the discharge slot of said moistener blade subsequent to the adjustment of said deflector plate to said one of said positions, and a liquid level chamber having an opening into the reservoir of said moistener blade operable to maintain a continuous supply of liquid along the outlet portion of said discharge slot for the withdrawal of liquid therefrom upon the passage of a gummed tape strip across said discharge slot.

21. In a tape feed device, the combination of a source of tape supply, a feed roller rotatable for a plurality of increments of rotation to advance the tape from said source of supply, a cutter mounted adjacent said feed roller in the path of advancement of the tape operable to sever the tape forming a strip of one of a plurality of selective lengths, a continuously operable auxiliary feed means for discharging the strip of tape subsequent to the operation of said cutter, an actuating means for causing an initial increment of rotation of said feed roller to advance the tape into engagement with said auxiliary feed means, means associated with said feed roller for rotation therewith operable to determine each of subsequent increments of rotation of said feed roller for tape strips of varying lengths following operation of said actuating means, a power-operated means cooperating with said associated means to terminate rotation of said feed roller following selected increments of rotation thereof and to simultaneously control operation of said cutter, and means adjustable selectively to enable operation of said power-operated means for each of the subsequent increments of rotation of said feed roller.

References Cited in the file of this patent
UNITED STATES PATENTS

| | | |
|---|---|---|
| 2,141,119 | Wheeler et al. | Dec. 20, 1938 |
| 2,371,070 | Sager et al. | Mar. 6, 1945 |
| 2,377,523 | Ryan et al. | June 5, 1945 |
| 2,456,414 | Heyel | Dec. 14, 1948 |
| 2,475,804 | Rouan et al. | July 12, 1949 |
| 2,741,982 | Rouan et al. | Apr. 17, 1956 |